US011623195B2

(12) United States Patent
You

(10) Patent No.: US 11,623,195 B2
(45) Date of Patent: Apr. 11, 2023

(54) REACTION APPARATUS AND METHOD

(71) Applicants: POSCO, Pohang-si (KR); RESEARCH INSTITUTE OF INDUSTRIAL SCIENCE & TECHNOLOGY, Pohang-si (KR)

(72) Inventor: Ki-Sung You, Pohang-si (KR)

(73) Assignees: POSCO HOLDINGS INC., Seoul (KR); RESEARCH INSTITUTE OF INDUSTRIAL SCIENCE & TECHNOLOGY, Pohang-si (KR)

(*) Notice: Subject to any disclaimer, the term of this patent is extended or adjusted under 35 U.S.C. 154(b) by 509 days.

(21) Appl. No.: 16/616,797

(22) PCT Filed: Jan. 12, 2018

(86) PCT No.: PCT/KR2018/000639
§ 371 (c)(1),
(2) Date: Nov. 25, 2019

(87) PCT Pub. No.: WO2018/221822
PCT Pub. Date: Dec. 6, 2018

(65) Prior Publication Data
US 2020/0078747 A1 Mar. 12, 2020

(30) Foreign Application Priority Data
May 29, 2017 (KR) .................. 10-2017-0066103

(51) Int. Cl.
*B01J 4/00* (2006.01)
*B01J 19/00* (2006.01)
(Continued)

(52) U.S. Cl.
CPC ............. *B01J 4/002* (2013.01); *B01F 23/43* (2022.01); *B01F 27/113* (2022.01);
(Continued)

(58) Field of Classification Search
CPC .. B01J 19/0066; B01J 19/006; B01J 19/1862; B01J 14/00; B01J 14/005; B01J 4/002; B01J 4/007
See application file for complete search history.

(56) References Cited

U.S. PATENT DOCUMENTS 4,670,397 A * 6/1987 Wegner .................. F24V 99/00
435/243
4,935,539 A 6/1990 Lee
(Continued)

FOREIGN PATENT DOCUMENTS

CN 1112032 A 11/1995
CN 1271185 A 10/2000
(Continued)

OTHER PUBLICATIONS

Japanese Office Action dated Dec. 1, 2020 issued in Japanese Patent Application No. 2019-565541.
(Continued)

*Primary Examiner* — Lessanework Seifu
(74) *Attorney, Agent, or Firm* — Morgan, Lewis & Bockius LLP

(57) ABSTRACT

Provided are an apparatus and a method for reaction for use in a co-precipitation reaction for preparing a catalyst or a cathode active material for a lithium secondary battery, which injects a raw material (a solution) at least between impellers according to the solution level in a vessel, thereby making a stirring speed uniform and, in particular, minimizing a concentration difference between solutions. The apparatus for the reaction may comprise: a reaction vessel; a stirring means provided inside the reaction vessel and having multistage impellers; and a raw material injecting
(Continued)

means, comprising at least one injection nozzle connected to the reaction vessel, for injecting a raw material at least between impellers.

17 Claims, 27 Drawing Sheets

(51) Int. Cl.
| | |
|---|---|
| *B01J 14/00* | (2006.01) |
| *C01G 53/00* | (2006.01) |
| *H01M 4/131* | (2010.01) |
| *H01M 4/1391* | (2010.01) |
| *H01M 4/525* | (2010.01) |
| *B01F 27/191* | (2022.01) |
| *B01F 23/43* | (2022.01) |
| *B01F 27/91* | (2022.01) |
| *B01F 27/113* | (2022.01) |
| *B01F 35/21* | (2022.01) |
| *B01F 35/71* | (2022.01) |
| *B01F 101/59* | (2022.01) |

(52) U.S. Cl.
CPC ............ *B01F 27/191* (2022.01); *B01F 27/91* (2022.01); *B01F 35/2112* (2022.01); *B01F 35/7179* (2022.01); *B01J 14/00* (2013.01); *B01J 19/0066* (2013.01); *C01G 53/006* (2013.01); *H01M 4/131* (2013.01); *H01M 4/1391* (2013.01); *H01M 4/525* (2013.01); *B01F 2101/59* (2022.01); *C01P 2006/40* (2013.01)

(56) References Cited

U.S. PATENT DOCUMENTS

| | | | |
|---|---|---|---|
| 6,250,796 | B1 | 6/2001 | Huang |
| 7,887,765 | B2 | 2/2011 | Varela-Fuentes et al. |
| 8,663,507 | B2 * | 3/2014 | Malcus .................. H01M 4/32 423/592.1 |
| 2006/0105239 | A1 | 5/2006 | Paulsen et al. |
| 2008/0160410 | A1 | 7/2008 | Sun et al. |
| 2015/0368374 | A1 * | 12/2015 | Sumida ................ B01J 19/0013 526/66 |
| 2016/0190582 | A1 | 6/2016 | Son et al. |

FOREIGN PATENT DOCUMENTS

| | | |
|---|---|---|
| CN | 204768648 U | 11/2015 |
| JP | S49-110864 U1 | 1/1973 |
| JP | S54-003673 U1 | 6/1977 |
| JP | 2007-136432 A | 6/2007 |
| KR | 20-0213862 Y1 | 3/2001 |
| KR | 10-2005-0083869 A | 8/2005 |
| KR | 10-2006-0035547 A | 4/2006 |
| KR | 10-0744759 B1 | 8/2007 |
| KR | 10-0887186 B1 | 3/2009 |
| KR | 10-2010-0112843 A | 10/2010 |
| KR | 10-1355183 B1 | 1/2014 |
| KR | 10-2014-0083854 A | 7/2014 |
| KR | 10-2015-0007718 A | 1/2015 |
| KR | 10-2016-0078031 A | 7/2016 |
| KR | 10-2017-0011845 A | 2/2017 |
| KR | 10-2017-0022245 A | 3/2017 |
| KR | 10-2018-0074250 A | 7/2018 |
| KR | 10-2018-0130241 A | 12/2018 |
| WO | 2008/043559 A1 | 4/2008 |

OTHER PUBLICATIONS

International Search Report in International Patent Application No. PCT/KR2018/000639, dated Apr. 17, 2019 with full English translation.

Chinese Office Action dated Mar. 3, 2021 issued in Chinese Patent Application No. 201880035002.0.

Extended European Search Report dated Apr. 22, 2020 issued in European Patent Application No. 18809959.2.

* cited by examiner

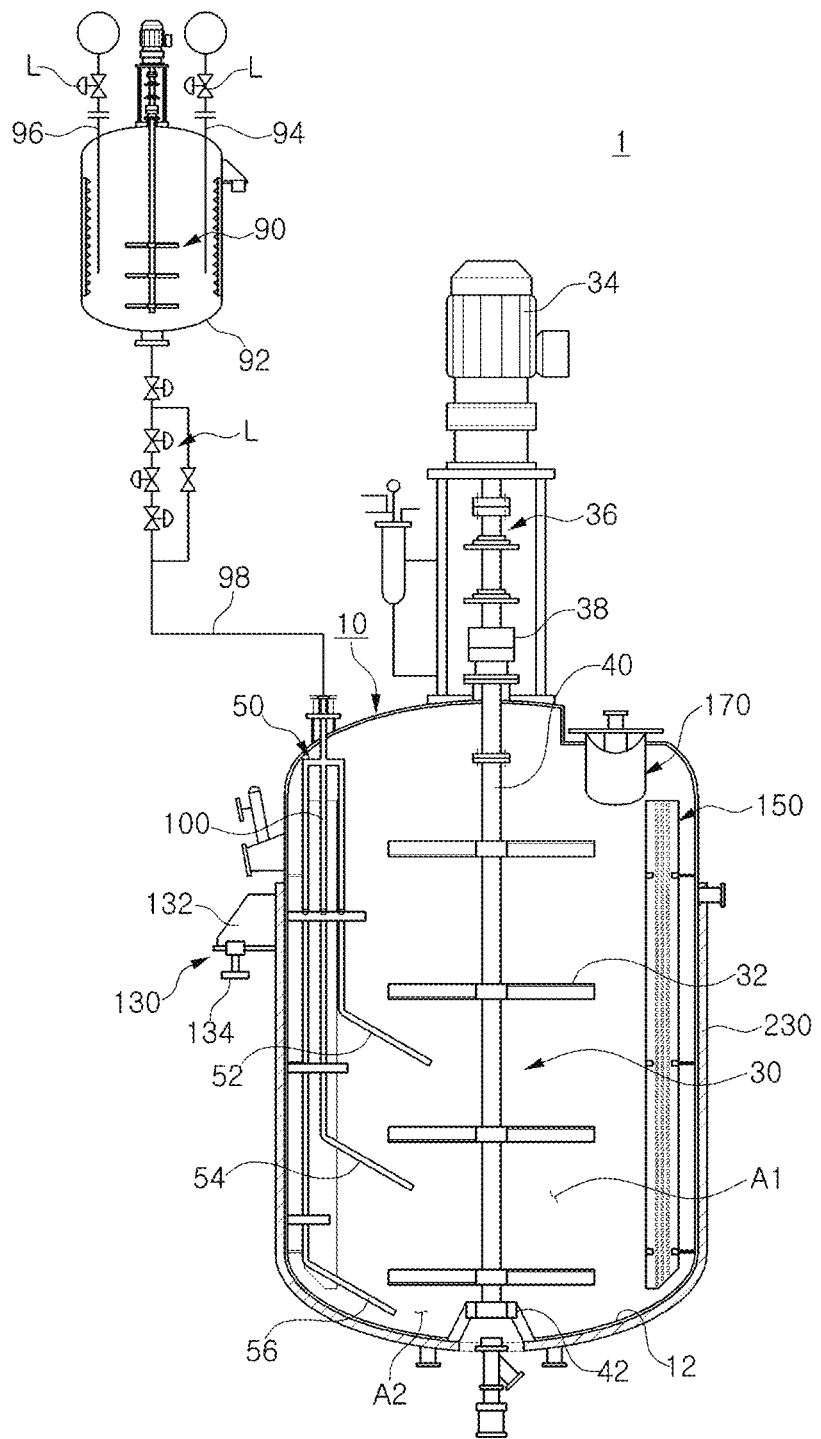
[Figure 1]

[Figure 2]
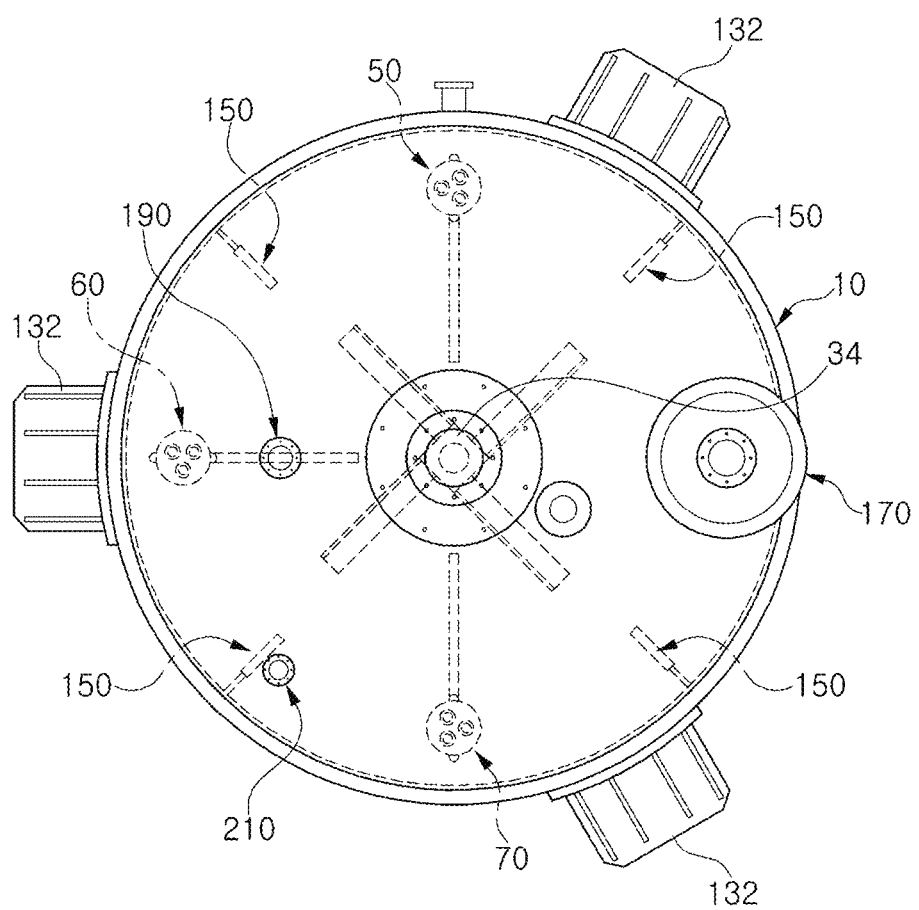

[Figure 3]
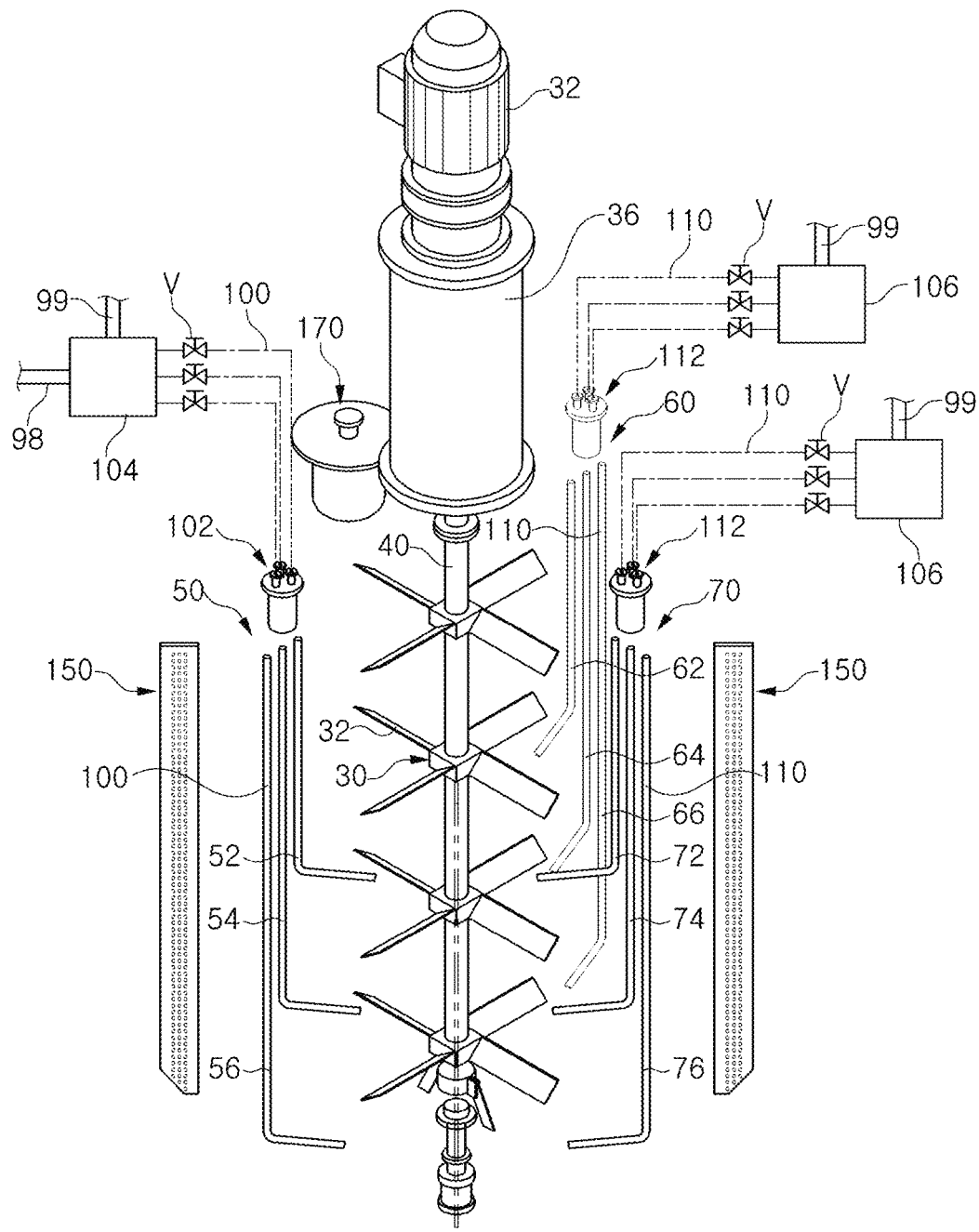

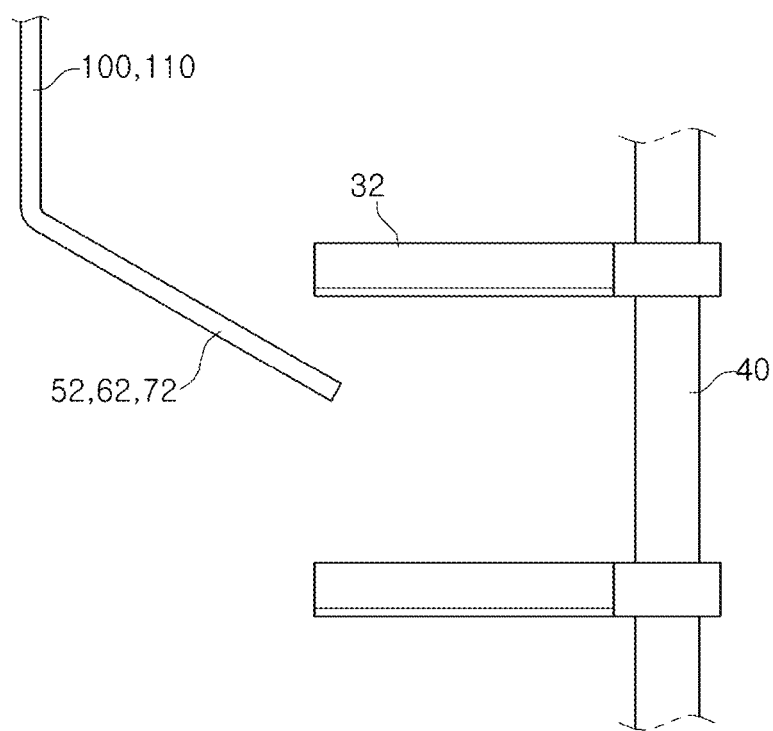
[Figure 4]

[Figure 5A]
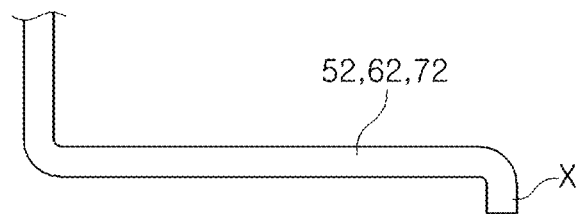
[Figure 5B]
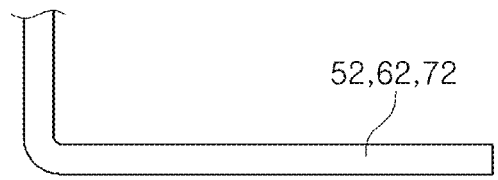
[Figure 5C]
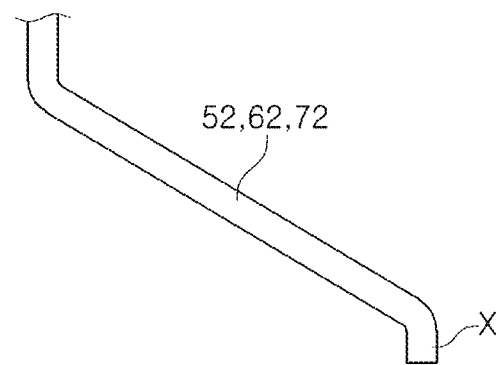

[Figure 6]
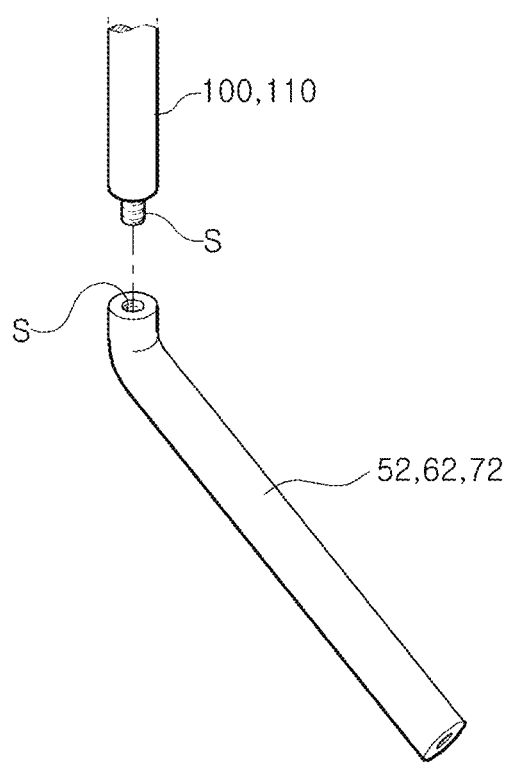

[Figure 7]
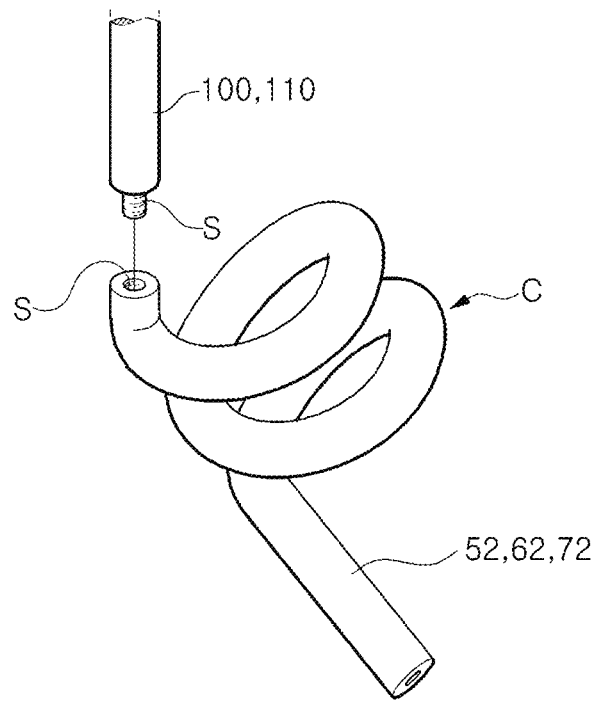
[Figure 8]
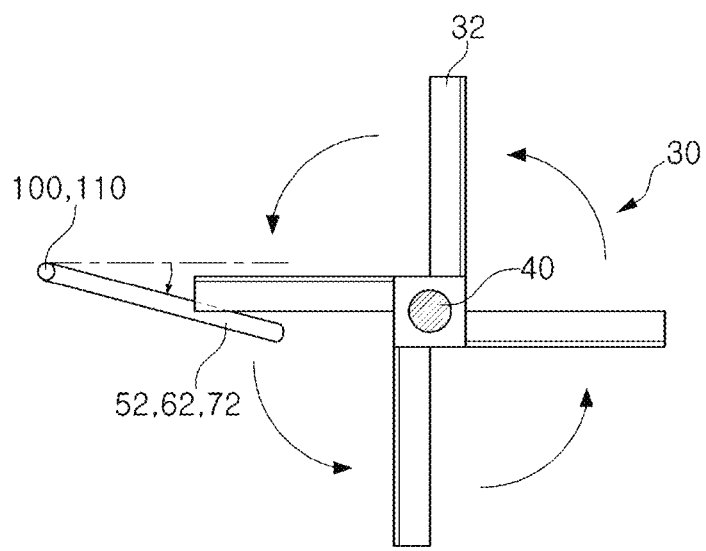

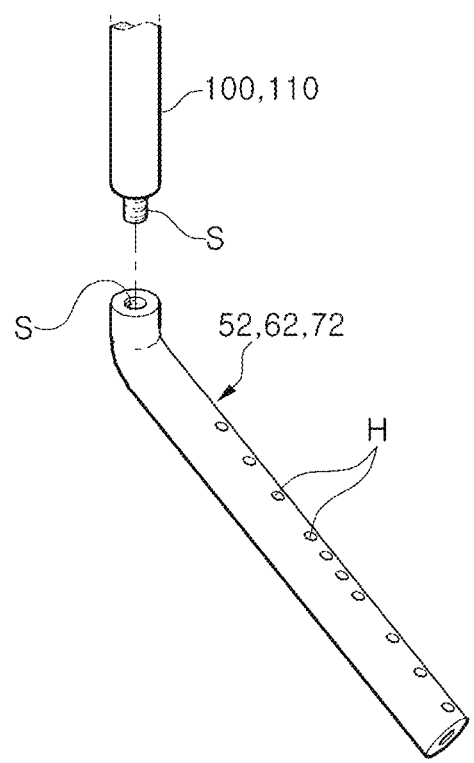
[Figure 9]

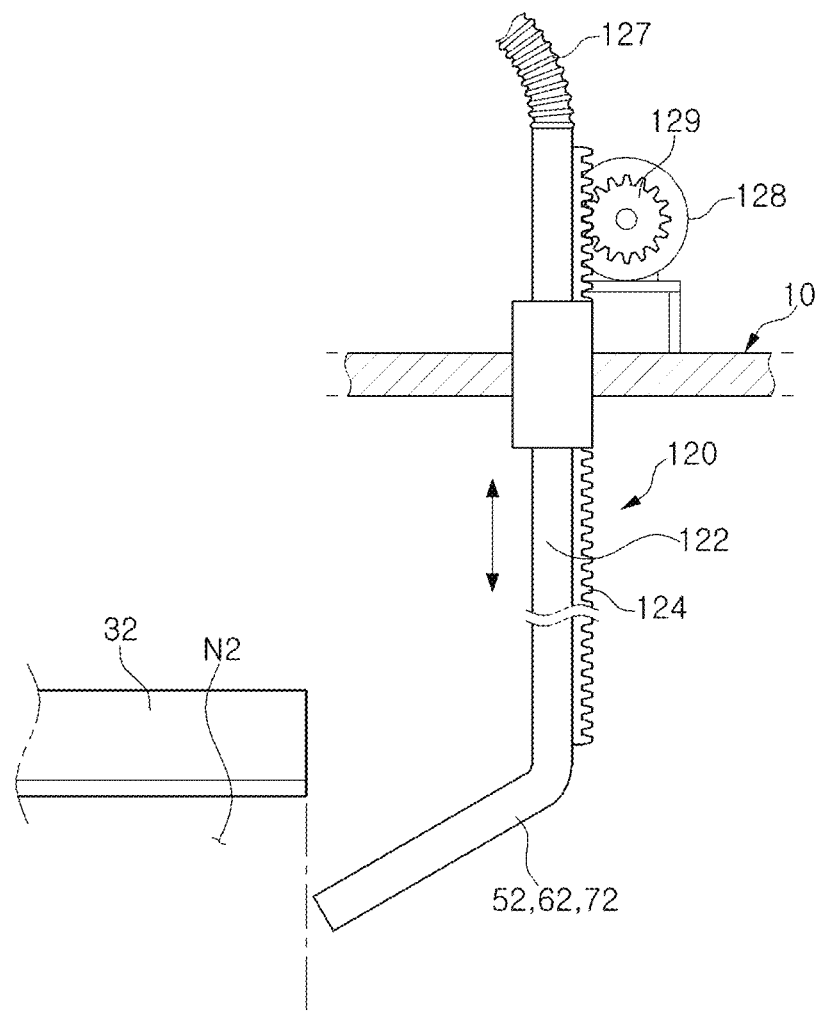
[Figure 10]

[Figure 11A]
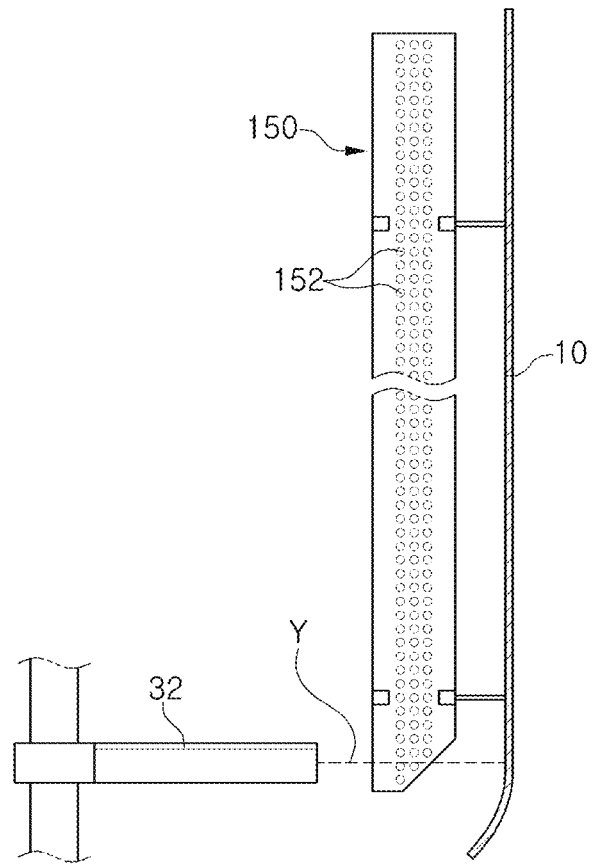
[Figure 11B]
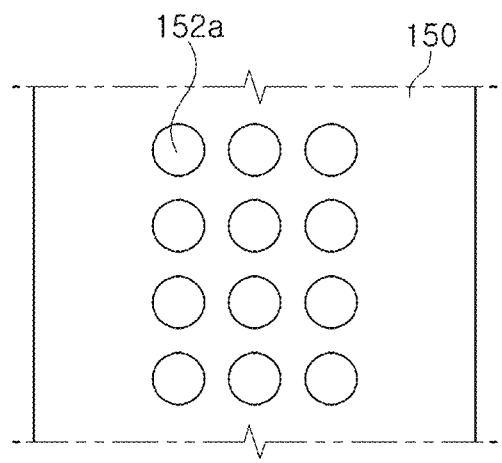

[Figure 11C]
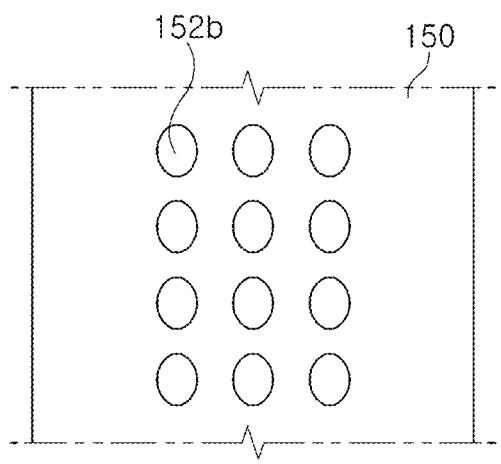
[Figure 11D]
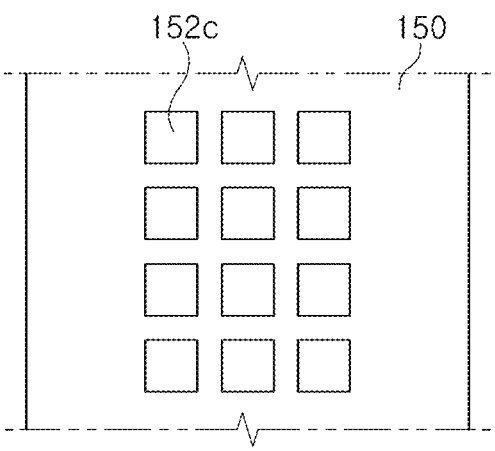

[Figure 11E]
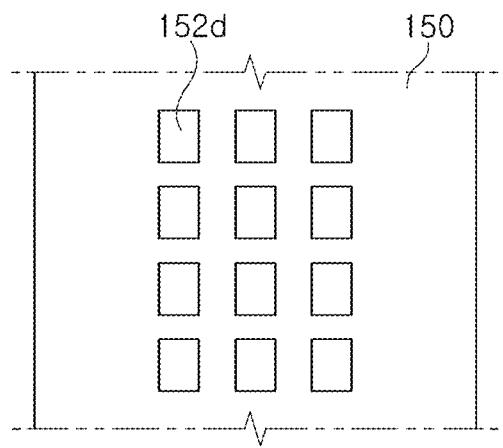
[Figure 11F]
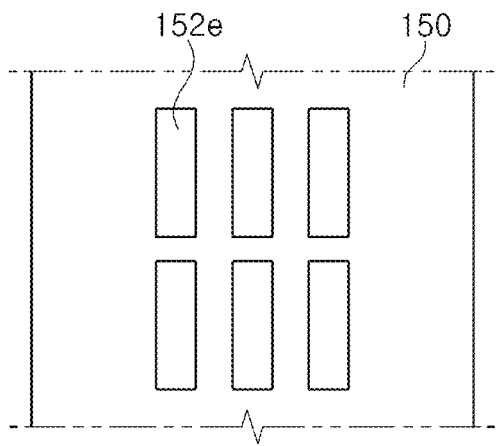

[Figure 12]
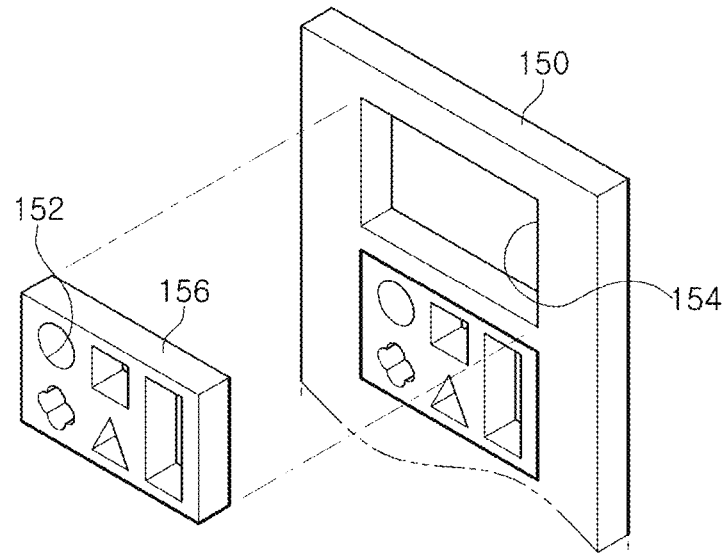
[Figure 13]
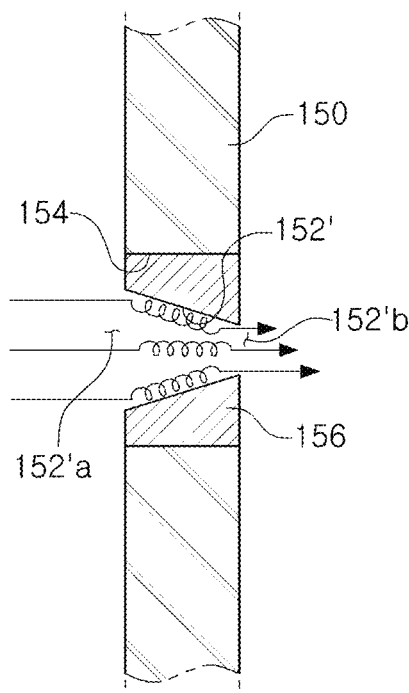

[Figure 14A]
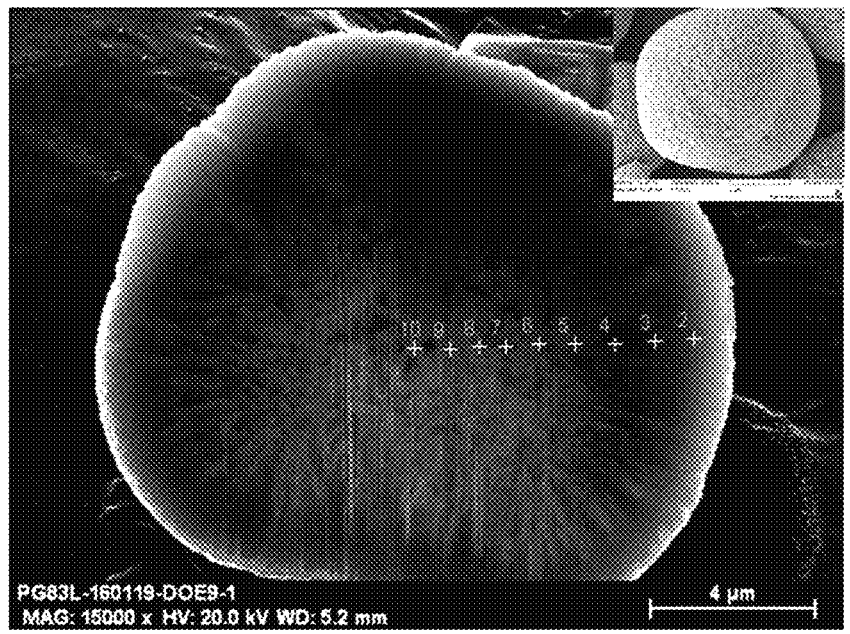
[Figure 14B]
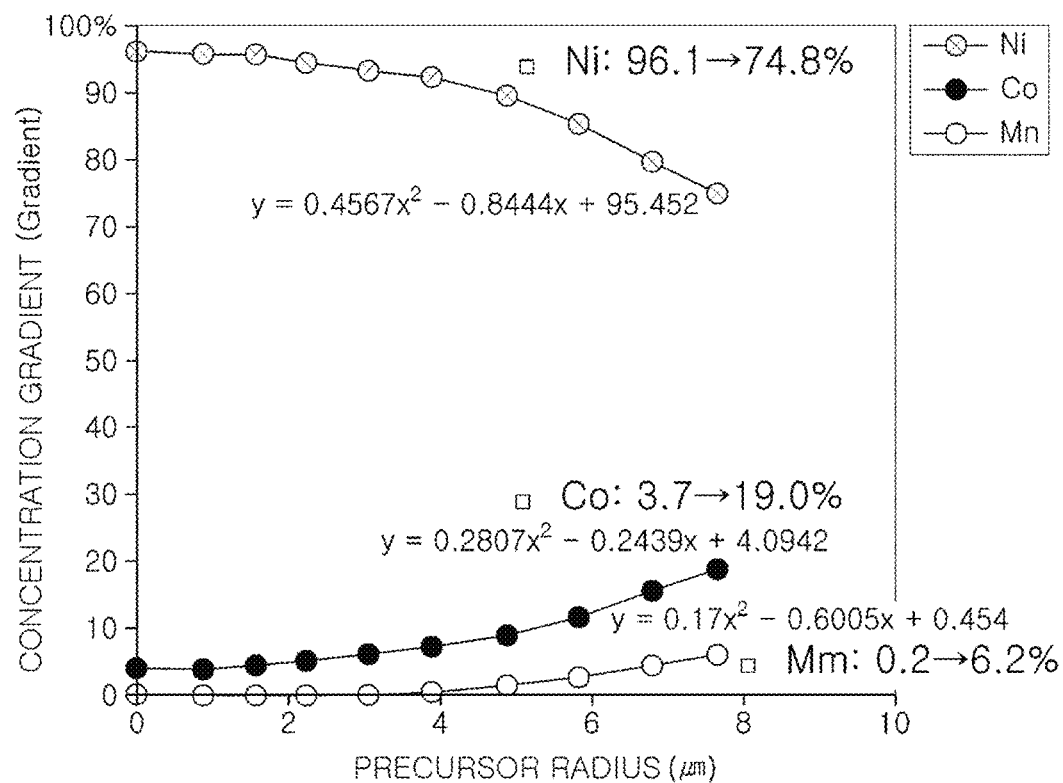

[Figure 15A]
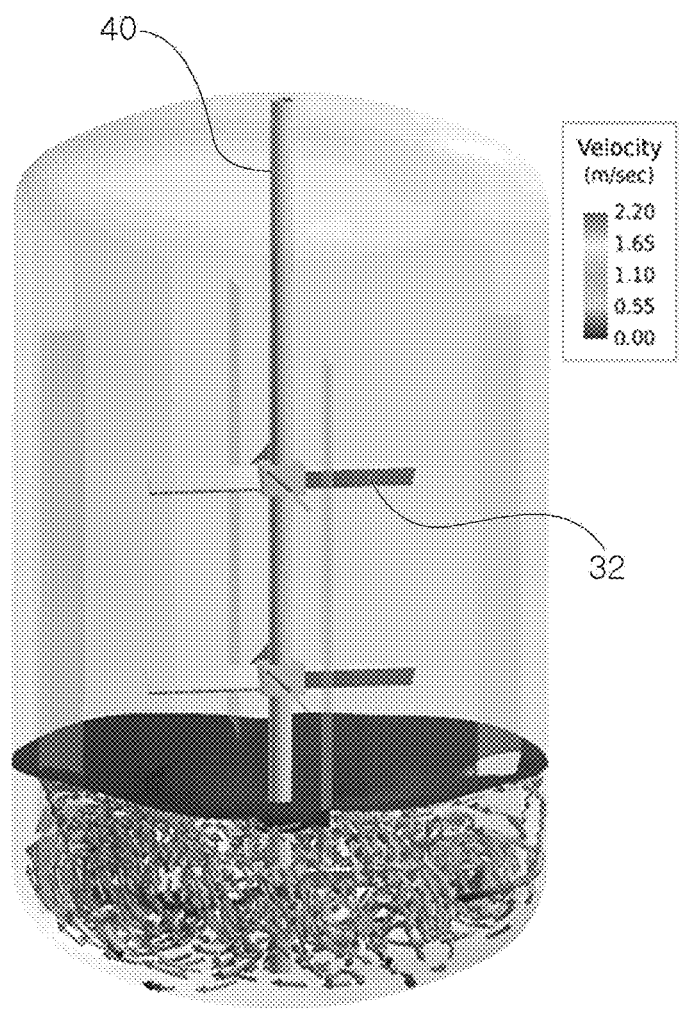

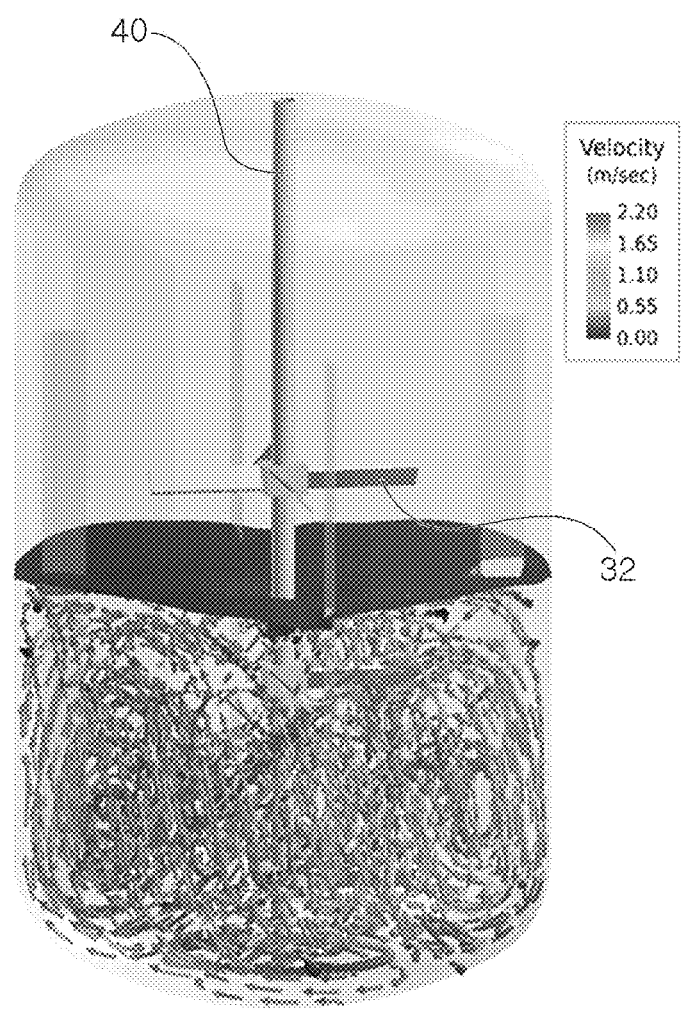
[Figure 15B]

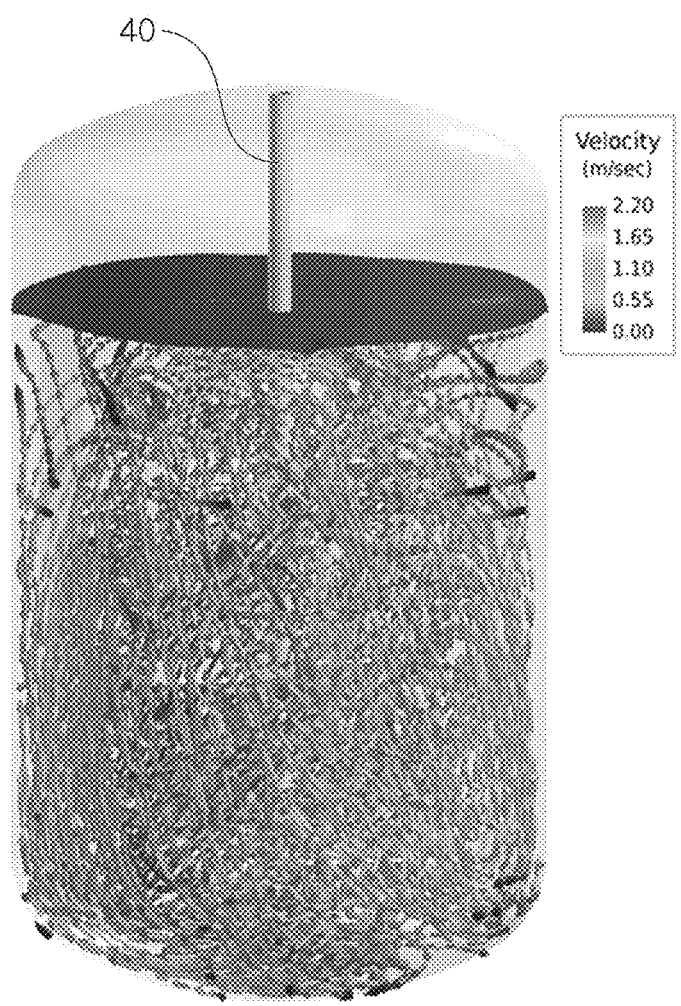
[Figure 15C]

[Figure 16A]
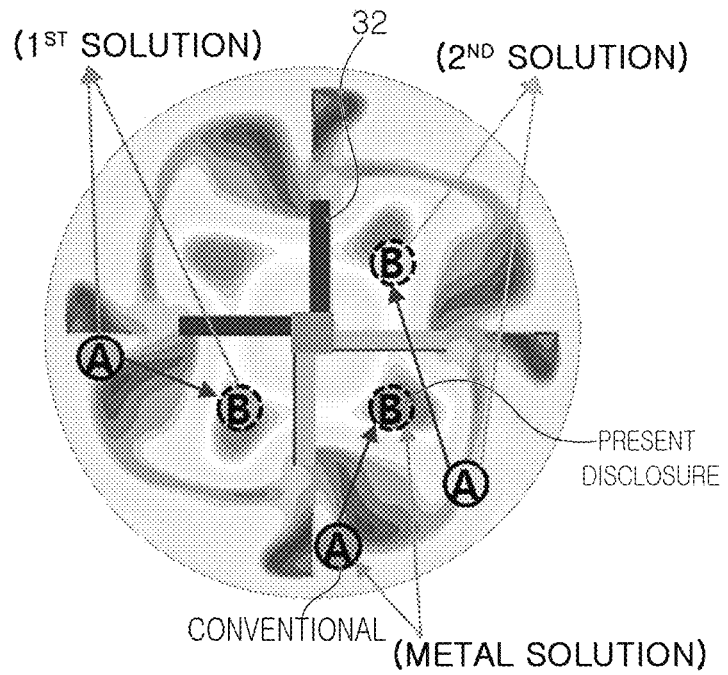
[Figure 16B]
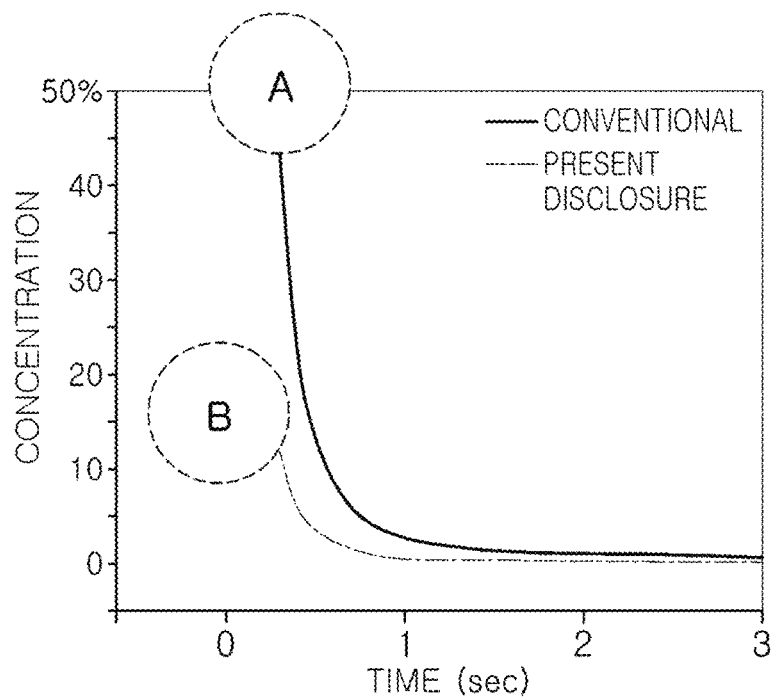

[Figure 17]
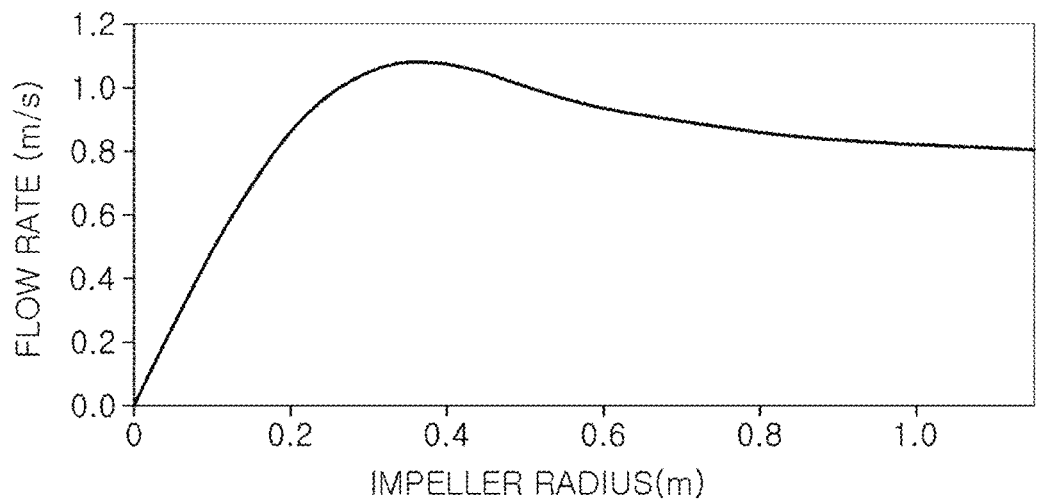
[Figure 18]
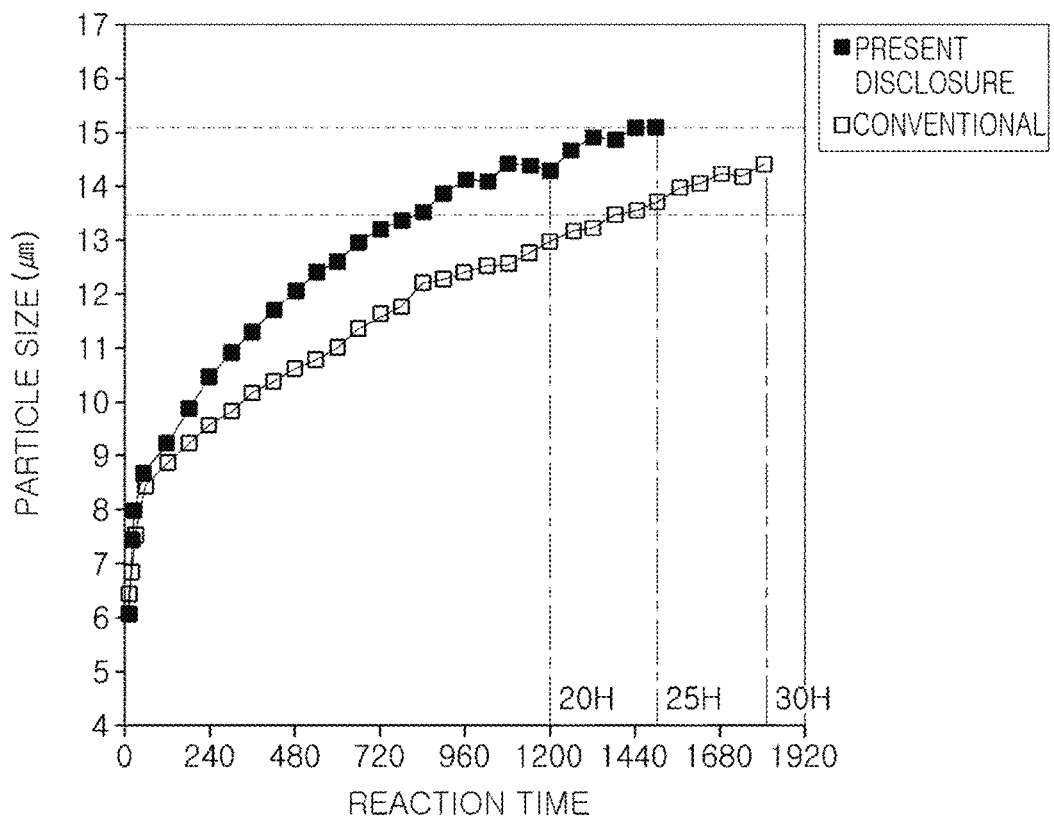

[Figure 19A]
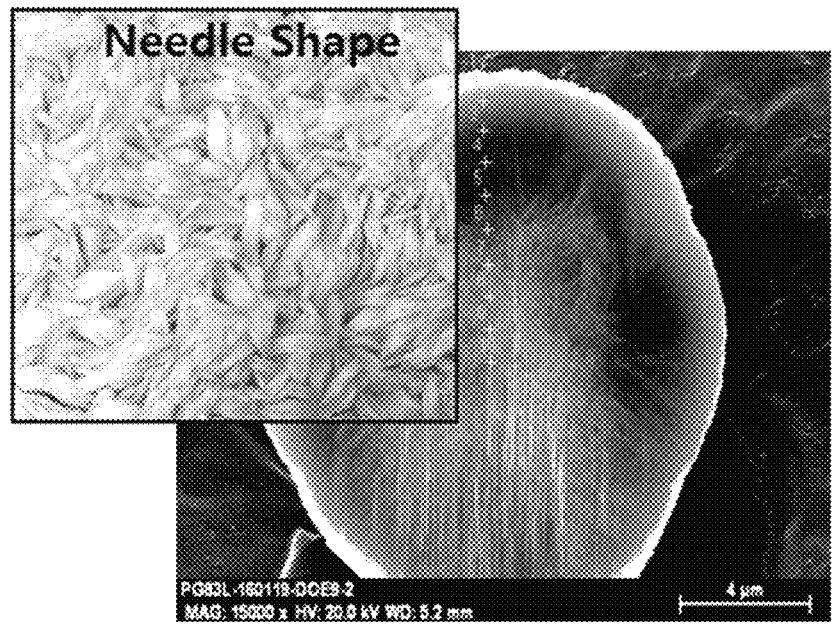
[Figure 19B]
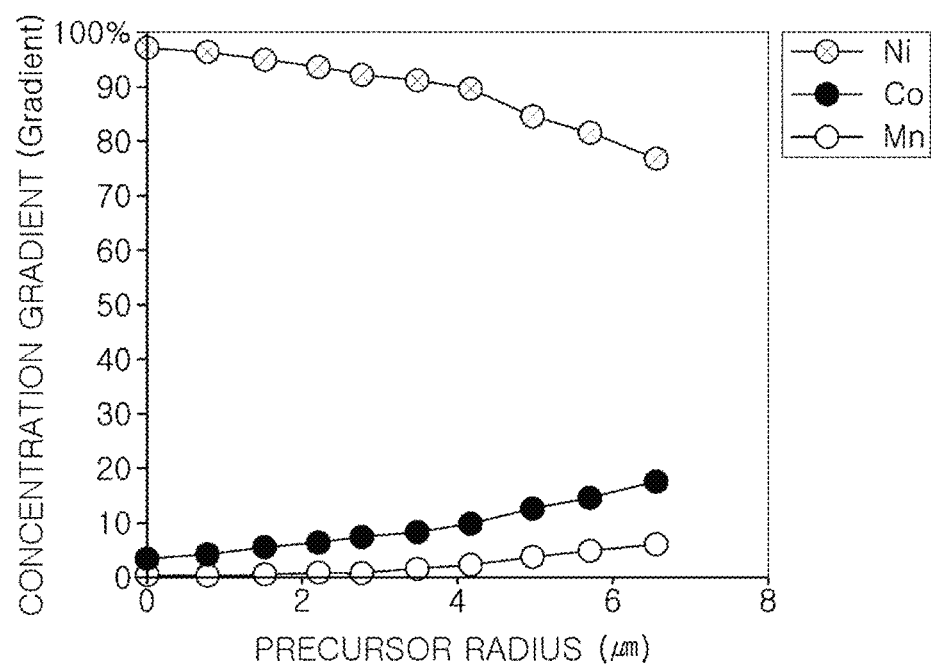

[FIGURE 20]
| ITEMS | | | CONVENTIONAL | CONVENTIONAL | PRESENT DISCLOSURE |
|---|---|---|---|---|---|
| REACTION | hour | | 30 | 15 | 10 |
| PARTICLE SIZE | $D_{50}$ | μm | 5.51 | 5.06 | 5.24 |
| Tap Density | | g/cc. | 1.66 | 1.3~1.5 | 1.67 |
| SEM IMAGE | | 20x | 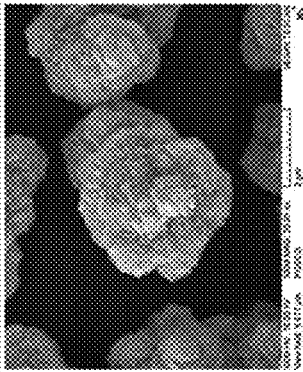 |  | 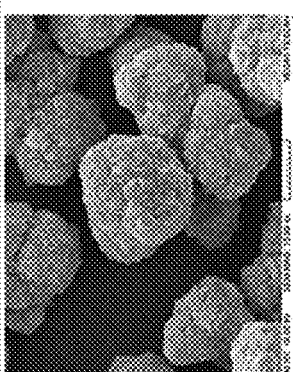 |

[Figure 21A]
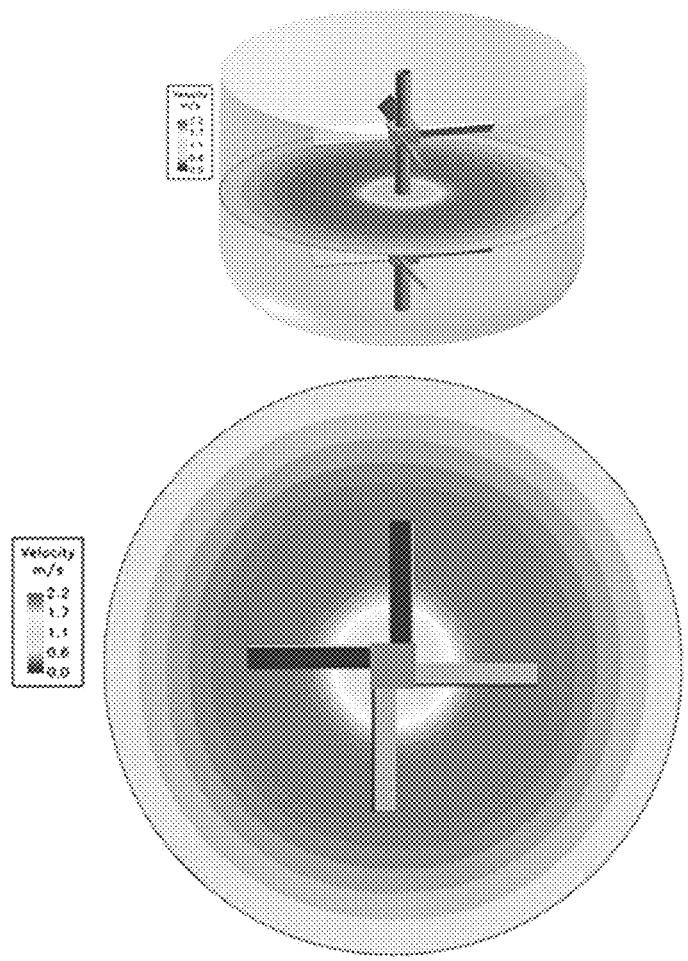

[Figure 21B]
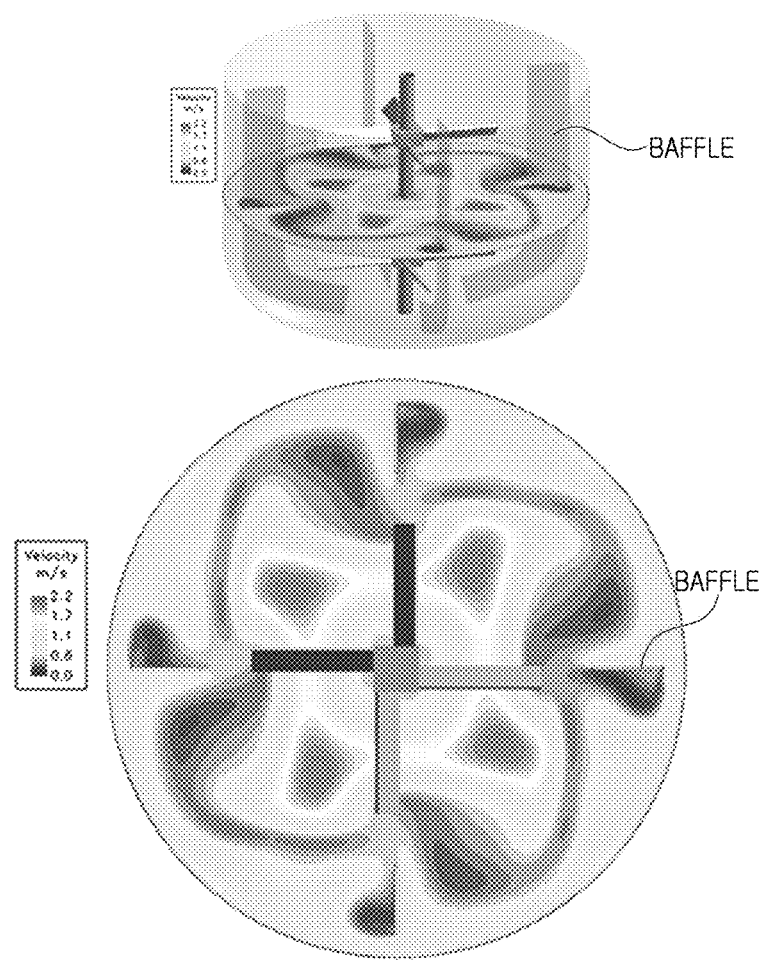

[Figure 22A]
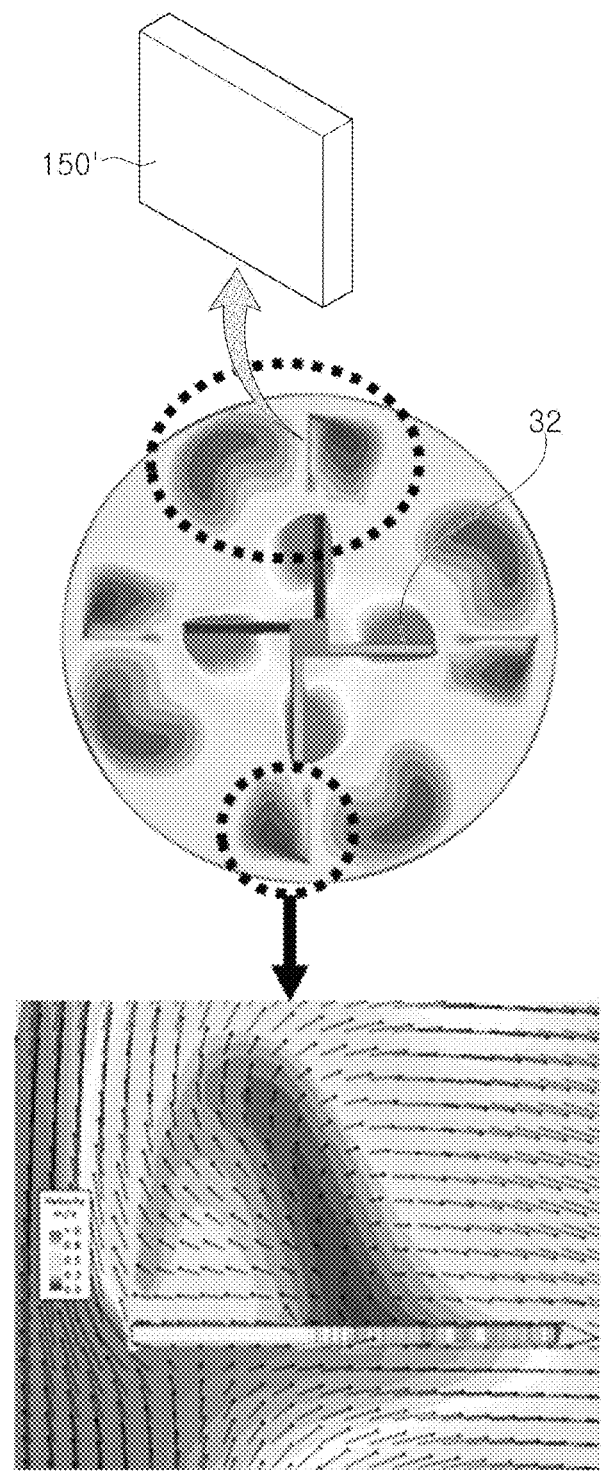

[Figure 22B]
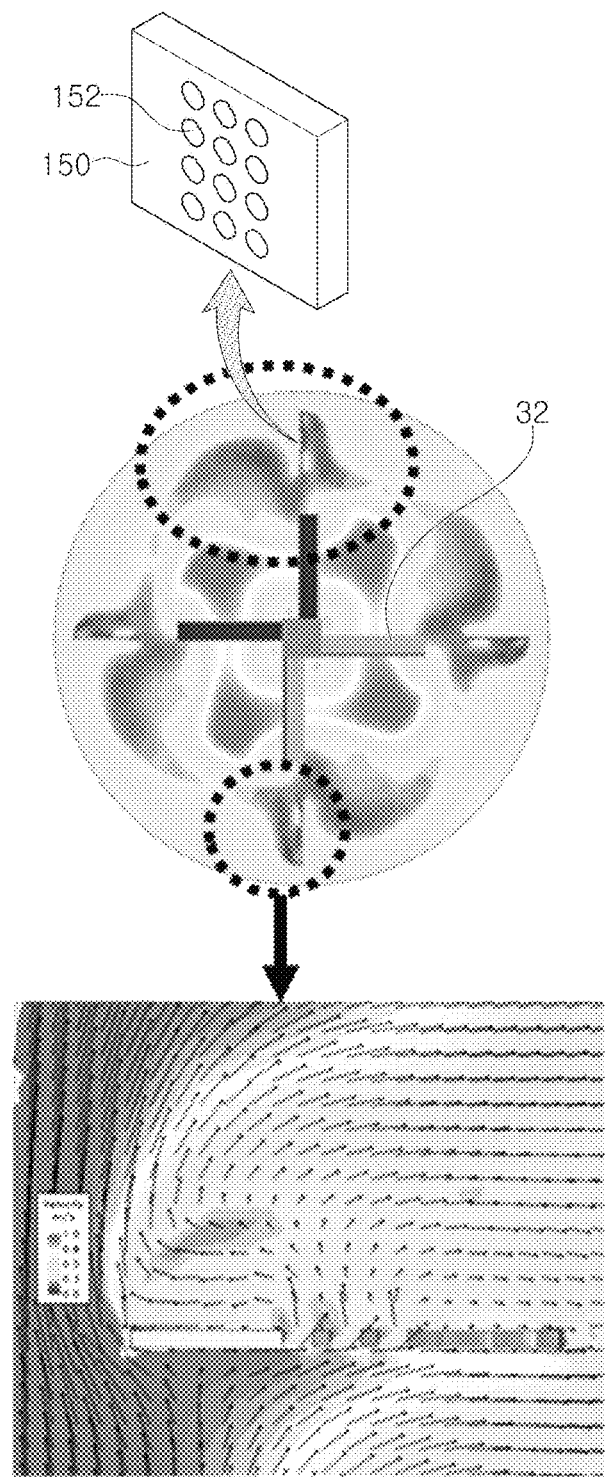

[Figure 23A]
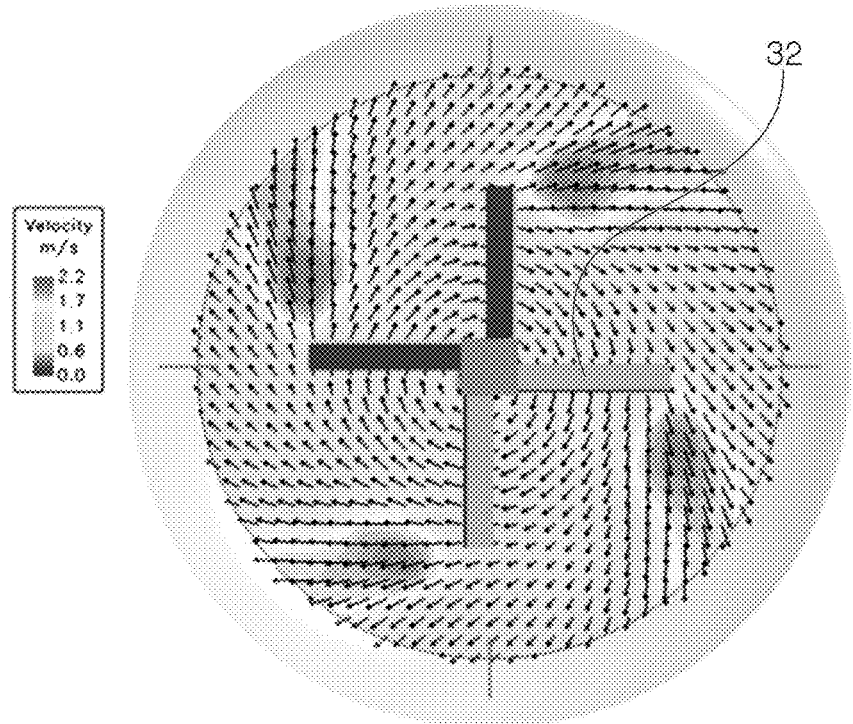

[Figure 23B]
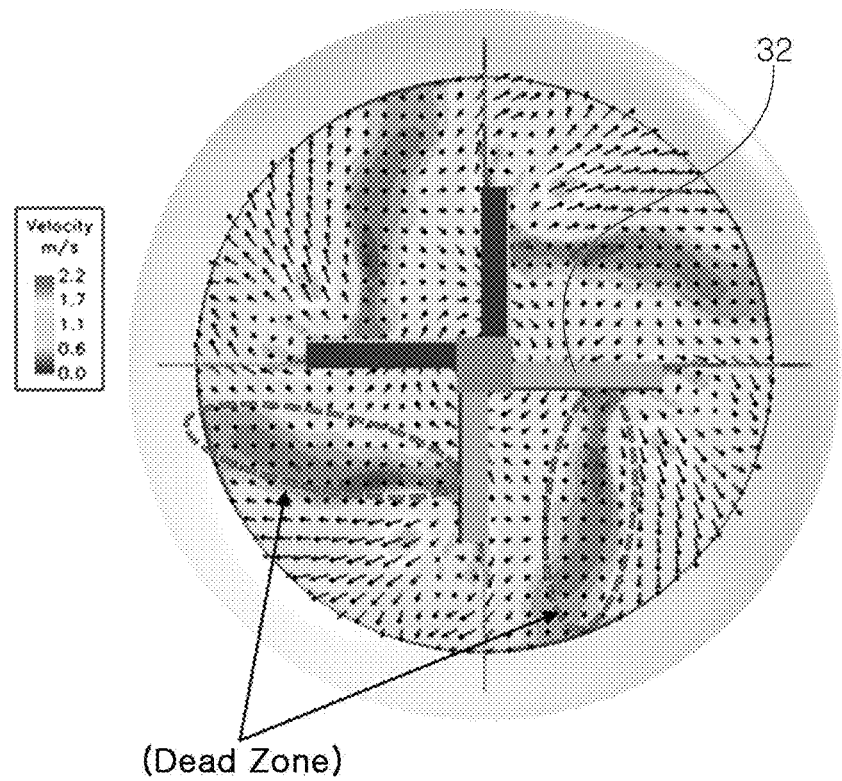
(Dead Zone)

REACTION APPARATUS AND METHOD

CROSS-REFERENCE OF RELATED APPLICATIONS

This application is the U.S. National Phase under 35 U.S.C. § 371 of International Patent Application No. PCT/KR2018/000639, filed on Jan. 12, 2018, which in turn claims the benefit of Korean Application No. 10-2017-0066103, filed on May 29, 2017, the entire disclosures of which applications are incorporated by reference herein.

TECHNICAL FIELD

The present disclosure relates to a reaction apparatus and a method, and more particularly to in a co-precipitation reaction for preparation of a catalyst or a cathode active material for a lithium secondary battery, a raw material (solution) is introduced into at least an interspace between impellers corresponding to a solution level in a vessel, thereby making a stirring speed uniform and particularly to minimizing a difference in concentrations between solutions.

BACKGROUND ART

Recently, as demand for mobile devices such as smart phones and laptops has increased and the hybrid or electric vehicle market has grown, demand for secondary batteries as an energy source is rapidly increasing. Among such secondary batteries, lithium secondary batteries exhibiting high energy density and operating potential and having a long cycle life and a low self-discharge rate are being widely used.

Lithium-containing cobalt oxides ($LiCoO_2$) are mainly used as a cathode active material of such lithium secondary batteries. In addition, use of lithium-containing manganese oxides such as $LiMnO_2$ having a layered crystal structure and $LiMn_2O_4$ having a spinel crystal structure, and lithium-containing nickel oxides ($LiNiO_2$) and ternary $LiNi_xMn_yCo_{(1-x-y)}O_2$ is also being researched.

Generally, the cathode active material of lithium secondary batteries is manufactured by a solid sate reaction at a high temperature of at least 700° C. This case, however, accompanies physical mixing and pulverization, thereby making a mixed state not uniform, and thus requires mixing and pulverization several times. Consequently, it takes an increased amount of manufacturing time and manufacturing costs also increase.

In this regard, wet manufacturing methods, represented by a sol-gel method and a co-precipitation method, which include hydrolysis and condensation, have been developed.

Meanwhile, in manufacturing of a nickel-cobalt-manganese precursor ($Ni_xCo_yMn_{1-x-y}(OH)_2$) or a nickel-cobalt-aluminum precursor ($Ni_xCo_yAl_{1-x-y}(OH)_2$), which is used as a cathode active material after being mixed with lithium in the lithium secondary batteries and sintered, co-precipitation methods employing a continuous stirred tank reactor (CSTR), Couette Taylor reactor, batch reactor, or the like, are widely utilized.

Such co-precipitation methods include precipitating chlorides, nitrides, or sulfides containing raw materials in a basic solution into hydroxides and enlarging a particle size thereof. In this regard, shapes, particle sizes, and morphology of the cathode active material precursor change depending on a pH, a temperature, and stirring conditions of a solution.

When a cathode active material precursor of a lithium secondary battery is manufactured by existing co-precipitation methods, CSTRs capable of mass production are mainly used. In the case of the CSTRs, however, a stirring speed of internal impellers may not be uniform while delaying a reaction time and increasing stabilization costs until a certain quality is achieved, thereby making it difficult to secure productivity and economic feasibility when a reaction is scaled up.

Meanwhile, to resolve the known problems of the CSTRs, a reactor using a Taylor vortex is used in terms of ununiform stirring speeds; however, due to high costs for stabilization, the reactor is applied only to particles having a small particle size of 7 μm or less. In the case of a scaled-up reaction, the reactor has an increasing diameter, thereby disabling formation of uniform Taylor vortex.

Furthermore, technology related to the manufacture of a precursor having a concentration gradient according to a center distance for improved high capacity characteristics and thermal safety of a cathode active material for lithium secondary batteries is disclosed in Korean Patent Laid-Open Publication No. 2005-0083869, and the like. However, there are limitations on the manufacturing method, in that only batch reactors, rather than CSTRs and reactors using a Taylor vortex, can be used. Such batch reactors require a significant amount of reaction time and due to ununiform stirring speeds, reactions cannot easily be scaled up. In addition, compared to CSTRs, batch reactors require high manufacturing costs and have low productivity as well as reduced sphericity.

DISCLOSURE

Technical Problem

In order to resolve such conventional problems, an aspect of the present disclosure is to provide an apparatus involving injecting raw materials (solutions) into at least an interspace between impellers according to a solution level in a vessel during co-precipitation for preparation of a catalyst or a cathode active material for a lithium secondary battery to have a uniform stirring speed and particularly to minimize a difference in concentrations between the solutions, and a method therefor.

Technical Solution

According to an aspect, the present disclosure includes a reaction vessel, a stirring means provided inside the reaction vessel and having multistage impellers, and a raw material-injecting means connected to the reaction vessel and including at least one injection nozzle injecting a raw material into an interspace between impellers.

According to another aspect of the present disclosure, the present disclosure includes metal solution injection involving injecting a metal solution obtained by mixing a core solution and a shell solution at a pre-determined ratio into a reaction vessel at a pre-determined flow rate, solution injection involving injecting other solutions into the reaction vessel at a pre-determined flow rate, and co-precipitation involving stirring the other solutions with the metal solution injected into the reaction vessel to prepare a cathode active material for a lithium secondary battery.

Advantageous Effects

According to the present disclosure, an effect of significantly reducing or suppressing a difference in concentrations of raw materials (solutions) in a reaction vessel is provided.

In particular, the present disclosure provides other effects of improving a growth rate of a cathode active material for a lithium secondary battery under same process conditions by performing uniform stirring and removing a concentration gradient while also improving sphericity of the precursor.

DESCRIPTION OF DRAWINGS

FIG. 1 is an overall configuration diagram illustrating a (co-precipitation) reaction apparatus according to the present disclosure.

FIG. 2 is a schematic planar view of FIG. 1.

FIG. 3 is a partially exploded perspective view schematically illustrating the reaction apparatus of FIG. 1.

FIG. 4 is a pictorial schematic diagram illustrating an injection nozzle of a raw material-injecting means of the present disclosure.

FIGS. 5A to 5C are schematic diagrams illustrating other exemplary embodiments of the injection nozzle of FIG. 4.

FIG. 6 is a perspective view of another exemplary embodiment of the injection nozzle.

FIG. 7 is a perspective view of another exemplary embodiment of the injection nozzle.

FIG. 8 is a schematic planar view of an installation environment of the injection nozzle.

FIG. 9 is a perspective view of another exemplary embodiment of the injection nozzle.

FIG. 10 is a diagram illustrating a mobile configuration of a supply pipe connected to the injection nozzle.

FIGS. 11A and 11B to 11F are an enlarged view of and schematic diagrams illustrating a porous baffle of the present disclosure.

FIG. 12 is a perspective view of another exemplary embodiment of the porous baffle.

FIG. 13 is a sectional view of another exemplary embodiment of the porous baffle.

FIGS. 14A and 14B are a photographic image and a graph illustrating a cathode active material (nickel-cobalt-manganese precursor ($Ni_xCo_yMn_{1-x-y}(OH)_2$)) having a concentration gradient depending on a center distance.

FIGS. 15A to 15C are images of simulation comparing flow and concentration gradient difference according to a solution level in a vessel.

FIGS. 16A and 16B are a image of simulation and a graph illustrating a difference in concentrations caused by different positions of the injection nozzle of the present disclosure and the prior art.

FIG. 17 is a graph illustrating flow rates of impellers according to positions thereof.

FIG. 18 is a graph illustrating particle size growth according to a reaction time of the nickel-cobalt-manganese precursor ($Ni_xCo_yMn_{1-x-y}(OH)_2$) of the present disclosure and the prior art.

FIGS. 19A and 19B are photographic images illustrating the nickel-cobalt-manganese precursor ($Ni_xCo_yMn_{1-x-y}(OH)_2$) having the concentration gradient according to the present disclosure and a graph of concentration gradients.

FIG. 20 is a comparative table showing a particle size and tap density of the nickel-cobalt-manganese precursor ($Ni_xCo_yMn_{1-x-y}(OH)_2$).

FIGS. 21A and 21B are images of simulation illustrating a flow state according to a presence of the baffle.

FIGS. 22A and 22B are images of simulation illustrating a flow state according to a presence of pores of the baffle.

FIGS. 23A and 23B are images of simulation illustrating a flow state according to an extended structure of a lower portion of the baffle.

BEST MODE

Hereinafter, the present disclosure will be described in detail with reference to the accompanying drawings. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

A reaction apparatus 1 of the present disclosure is may be a co-precipitation apparatus preparing a catalyst or a cathode active material for a lithium secondary battery based on a continuous stirring reactor (CSTR).

The reaction apparatus is not necessarily limited to be utilized in a production environment of cathode active materials, and may be applied to, for example, reactions (production) of other materials involving injecting a raw material (solution) and stirring based on a stirring means to react.

In addition, as a preferred embodiment, the present disclosure may relate to a co-precipitation reaction for production of a cathode active material precursor for a lithium secondary battery, for example, a nickel-cobalt-manganese precursor ($Ni_xCo_yMn_{1-x-y}(OH)_2$) or a nickel-cobalt-aluminum precursor In addition, as a preferred embodiment, the present disclosure may relate to a co-precipitation reaction for production of a cathode active material precursor for a lithium secondary battery, for example, a nickel-cobalt-manganese precursor ($Ni_xCo_yMn_{1-x-y}(OH)_2$) or a nickel-cobalt-aluminum precursor ($Ni_xCo_yAl_{1-x-y}(OH)_2$) having a concentration gradient depending on a center distance.

For example, FIGS. 14A and 14B area photographic image and a graph illustrating the nickel-cobalt-manganese precursor ($Ni_xCo_yMn_{1-x-y}(OH)_2$) having a concentration gradient depending on a center distance to enhance high capacity and thermal safety of the cathode active material. This indicates that a concentration of nickel (Ni) is high in the center while those of cobalt (Co) and manganese (Mn) are relatively increasing in a direction away from the center.

Further, in an exemplary embodiment, a co-precipitation reaction is carried out by injecting a pre-determined amount of ammonia ($NH_4OH$; second solution) and a target pH is adjusted with sodium hydroxide (NaOH; first solution), followed by adding a metal solution (having a composition of Ni:Co:Mn in the case of NCM or Ni:Co:Al in the case of NCA), NaOH (first solution) and NH4OH (second solution). In this regard, the raw material is limited to the metal solution and the first and second solutions (NaOH and $NH_4OH$) to describe the exemplary embodiment; however, the raw material is not limited thereto.

Hereinbelow, the present disclosure will be described in detail.

As illustrated in FIGS. 1 to 3, the reaction apparatus 1 according to the present disclosure may be provided to include a reaction vessel 10, a stirring means 30 inside the reaction vessel 10 and having multistage impellers 32, and a raw material-injecting means including at least one injection nozzle connected to the reaction vessel and injecting a raw material into at least an interspace A1 between the impellers.

In other words, the reaction apparatus 1 of the present disclosure basically involves injecting the previously described metal solution and first and second solutions into the interspace A1 between the impellers 32. A reaction effect may be increased when the solutions are injected into the interspace A1 between the impellers.

The reaction vessel 10 of the reaction apparatus 1 is schematically illustrated in the drawings, but may be provided in a structure in which a cylindrical body (no reference number) of the center, a bottom 12 and an upper cover (no reference number) are assembled via a flange structure, or a structure in which the upper cover is easily detached from or assembled with the cylindrical body as the stirring means 30 is disposed therein.

As illustrated in FIGS. 1 and 3, the stirring means 30 of the reaction apparatus 1 may include multistage impellers 32, preferably at least four-staged impellers 32.

In other words, the impellers are connected to a rotating shaft 40, which is connected to a motor 34, a coupling 36 and a sealing member 38 provided in an external upper side of the reaction vessel 10, and penetrates the reaction vessel 10 vertically, and whose lower portion is supported by a bearing 42. Impellers 32 are provided in at least four stages in the vertical direction of the rotating shaft, and four impellers 32 in each stage are provided in a circumferential direction on the rotation shaft 40.

The impellers 32 may not be provided horizontally with the rotating shaft 40 but may be provided to be inclined for a stirring effect.

As further illustrated in FIGS. 1 to 3, the raw material-injecting means in the reaction apparatus 1 basically includes a first raw material-injecting means 50 injecting a metal solution into at least an interspace A1 between the impellers.

In particular, the first raw material-injecting means 50 is disposed outside of the reaction vessel 10 and is connected to a metal solution-mixing means 90 mixing a shell solution and a core solution of the meal solution at a pre-determined ratio and supplying the same.

In this regard, as the reaction apparatus 1 of the present disclosure employs mixing the shell solution and the core solution of the metal solution at a pre-determined ratio and supply the same to the first raw material-injecting means 50, a cathode active material precursor ($Ni_xCo_yMn_{1-x-y}(OH)_2$ or $Ni_xCo_yAl_{1-x-y}(OH)_2$) having a concentration gradient according to a center distance can be easily produced and co-precipitation efficiency can be improved.

For example, although not illustrated in the drawings, a core solution and a shell solution were conventionally supplied to a reaction vessel (10) depending on manual experience, which caused a lot-by-lot variation.

As illustrated in FIG. 1, the mixing means 90 includes a mixing tank 92, to which a core solution-supply pipe 94 and a shell solution-supply pipe 96 are separately connected, and flow regulators L are provided in the core solution-supply pipe 94 and the shell solution-supply pipe 96 to regulate a supply amount of each solution.

The mixing tank 92 of the mixing means 90 is connected to a connection pipe 98 and the metal solution-supply pipe 100 of the first raw material-injecting means 50 injecting the metal solution into the reaction vessel. The previously described flow regulator L is also provided in the connection pipe 98.

As illustrated in FIG. 1, in the case where the metal solution is injected inside the reaction vessel 10, particularly at least an interspace A1 between the impellers 32, the core and shell solutions are supplied to the mixing tank 92 at a pre-determined flow rate through the flow regulator L. The core and shell solutions are mixed in the mixing tank, and the metal solution in which the core and shell solutions are mixed at a pre-determined ratio is supplied to injection nozzles of the first raw material-injecting means 50 through the connection pipe 98.

The metal solution can also be controlled to be supplied to the first raw material-injecting means 50 at a pre-determined flow rate by the flow regulator L provided in the connection pipe 98.

As previously described and illustrated in FIGS. 1 to 3, the raw material may further include first and second solutions for preparation of a cathode active material precursor for a lithium secondary battery. Accordingly, the raw material-injecting means of the present disclosure may further include second and third raw material-injecting means 60 and 70 for injecting the first and second solutions into at least the interspace A1 between the impellers, in addition to the first raw material-injecting means 50 injecting the metal solution into the reaction vessel 10.

More preferably, the first to third raw material-injecting means 50 to 70 of the reaction apparatus 1 may include injection nozzles 52, 54, 56, 62, 64, 66, 72, 74 and 76 injecting the raw materials (the metal solution, the first and second solutions) into an interspace A2 between a bottom 12 of the reaction vessel 10 and a lowermost impeller, in addition to the interspace A1 between the impellers described above.

That is, when an upper side of the four-staged impellers refers to a first stage, in order to inject first and second raw materials together with the metal solution into an interspace between second stage impellers and third stage impellers, an interspace between the third stage impellers and fourth stage impellers and the interspace A2 between the fourth stage impellers and the vessel bottom, the first to third raw material-injecting means 50 to 70 can include three-staged injection nozzles 52, 54, 56, 62, 64, 66, 72, 74 and 76.

An injection nozzle for injecting the solutions into an interspace between the first stage impellers and the second stage impellers can also be included.

Further, as illustrated in FIG. 2, the first raw material-injecting means 50 injecting the metal solution into the reaction vessel may preferably be spaced apart from the second and third raw material-injecting means 60 and 70 respectively injecting the first and second solutions into the reaction vessel by 90° from left to right counterclockwise in a cross-section of the reaction vessel.

More specifically, the injection nozzles 52, 54 and 56 of the first raw material-injecting means 50 may be individually connected to three metal solution-supply pipes 100 connected to the connection pipe 98, which is connected to the mixing means 90.

The three metal solution-supply pipes 100, while being spaced apart from each other, may be installed to be perpendicular to supporters 102 installed through an upper cover (no reference number) of the reaction vessel 10 as illustrated in FIG. 3.

Similarly, the injection nozzles 62, 64, 66, 72, 74 and 76 of the second and third raw material-injecting means 60 and 70, which inject the first and second solutions may be provided in a lower portion of the three solution-supply pipes 110 vertically fixed to supporters 112 installed through the reaction vessel 10.

In order to enable the solutions to be selectively injected through the injection nozzles, the three metal solutions and solution-supply pipes 100 and 111, as illustrated in FIG. 3, are connected to distributors 104 and 106, and opening/closing valves V may be provided in the supply pipes to control the supply. Accordingly, the metal solutions and the solutions may be injected to the spaces A1 and A2 inside the reaction vessel through the entire nozzles or selectively through the injection nozzles.

The metal solution-connection pipes 98 connected to the mixing tank 92 and connection pipes 99 connected to first and second solution tanks (not specifically illustrated) may be connected to the distributors 104 and 106. Supply flow rates of the first and second solutions can also be controlled by the flow regulators (not illustrated).

More preferably, a vessel weight-sensing means 130 is further provided outside of the reaction vessel 10. For example, as illustrated in FIG. 1, the vessel weight-sensing means 134, such as a load cell, and the like, may be provided in a lower portion of one of supporting structures 132 attached to the outside of the reaction vessel 10.

Although a single vessel weight-sensing means 130 is illustrated in FIG. 1, it may be provided at least on both sides of the reaction vessel.

Accordingly, injection positions inside the reaction vessel through the injection nozzles 52, 54, 56, 62, 64, 66, 72, 74 and 76 of the first to third raw material-injecting means 50, 60 and 70 can be adjusted since the reaction vessel 10 of the present disclosure has an increasing weight as levels of the solutions injected thereinside increase.

That is, as illustrated in FIGS. 1 to 3, the metal solution and the first and second solutions are injected together with water through the lowermost injection nozzles 56, 66 and 76 located in the interspace A2 between the lowermost impeller 32 and the vessel bottom 12 during an initial stage of operation. As the solution level of the reaction vessel increases, the solutions and water may be injected inside the reaction vessel sequentially through the injection nozzles 52, 54, 62, 64, 72 and 74 disposed in the interspace A1 between the third stage impellers and the fourth stage impellers and the interspace A2 between the second stage impellers and the third stage impellers.

That is, in the reaction apparatus 1, the metal solutions and the first and second solutions are injected into the interspace between impellers inside the reaction vessel through the first to third raw material-injecting means 50, 60 and 70, and the injection can be carried out sequentially depending on the locations of the injection nozzles corresponding to the solution levels in the reaction vessels.

The injection method of the present disclosure involving injecting the metal solution and the first and second solutions into at least the interspaces between the impellers to correspond to the solution levels of the reaction vessel through the multistage injection nozzles may maximize efficiency in reduction of concentration difference.

Meanwhile, FIGS. 15A to 15C illustrate a simulation result obtained by comparing flows and a difference in concentrations according to the solution levels in the reaction vessel. When a level of the injected solution is low, there is no significant different in concentration, whereas the concentration difference between a lower portion and an upper portion of the solution increases as the injected solution level increases.

Generally, morphology of a cathode active material precursor in a growth stage is determined by pH. As illustrated in FIG. 15, in a conventional case, in which the injection nozzle is present only in the lower portion of the reaction vessel, difference in pH between the upper and lower portion increases as the solution level increases, since the solutions are injected only in the lower portion of the vessel despite the increased solution level. The concentrations of the metal solution and $NH_4OH$ (second solution) may not be uniform.

In the case of the Ni—Co—Mn precursor ($Ni_xCo_yMn_{1-x-y}(OH)_2$), a chelating agent ($NH_4OH$; second solution) for production of a complex ion may be injected to stimulate co-precipitation. Changes in the concentration of such a complex ion chelating agent affect nucleus and core creation during an initial stage of the co-precipitation and growth rate during precursor growth. When difference in the concentrations is generated, the precursor cannot easily have uniform morphology, thereby causing poor sphericity and a slow growth rate. During some intervals, the nucleus may be generated, which gives rise to generation of fine powder.

Accordingly, in the case of the present disclosure, the metal solutions and the first and second solutions are injected into the interspaces between the impellers through at least three-staged injection nozzles disposed in a vertical direction of the reaction vessel according to the solution level. This enables suppression of concentration difference according to difference in solution levels and increases co-precipitation efficiency while improving cathode active material productivity.

FIGS. 16A and 16B show results of simulation with difference in concentrations of the metal solution and the first and second solutions (NaOH and $NH_4OH$) depending on the injection positions of the injection nozzles in a radial direction of the impellers 32, and FIG. 17 shows a graph of flow rates depending on the positions in the impeller 32.

In FIG. 16, when the injection positions of the metal solution and the first and second solutions are "B" region, an interspace between the impellers of the present disclosure, rather than "A", a space adjacent to a wall of a conventional vessel container, the concentration difference in the injected solutions are small.

It can be seen in FIG. 17 that the flow rate according to positions in the radial direction of the impeller is highest at the center of the impeller, that is, a position spaced apart from a rotational axis 40 at a certain distance in the radial direction of the impeller. Accordingly, it is preferable that the injection nozzles be disposed in a position where the flow rate is the highest to inject the solutions.

For example, referring to FIG. 17, it is most preferable to arrange the injection nozzles of the present disclosure at a position spaced about 0.4 m from the rotational axis in the impeller radial direction, and to inject the solutions. That is, it may be desirable to position the injection nozzle near the center in the radial direction of the entire length of the impeller.

In the case of the present disclosure, as the solutions are injected into at least the interspace ("B" region of FIG. 16A) between the impellers, the solutions are injected in a space (region) where the flow rate is relatively high in the radial direction of the impeller.

Accordingly, in the present disclosure, the metal solution and the first and second solutions are injected at a position spaced apart from the rotational axis in the radial direction of the impeller in the interspace A1 between the impellers, not a region adjacent to the reaction vessel wall, at a pre-determined distance through the injection nozzles. In this regard, manufacture quality of the Ni—Co—Mn precursor ($Ni_xCo_yMn_{1-x-y}(OH)_2$) or Ni—Co—Al precursor ($Ni_xCo_yAl_{1-x-y}(OH)_2$) having a concentration gradient according the center distance can be particularly enhanced.

FIG. 18 illustrates particle size growth according to a reaction time of the Ni—Co—Mn precursor ($Ni_xCo_yMn_{1-x-y}(OH)_2$) prepared through the reaction apparatus 1 of the present disclosure. It can be understood that under the same process conditions, a case (red) in which the position of the solution injection of the injection nozzle is adjusted according to the solution level as in the present disclosure has a greater particle size growth rate than a conventional case (blue), in which the solution is only injected into the lower portion of the reaction vessel while fixing the injection position of the injection nozzle along the vessel wall. Further, the present disclosure has a relatively higher growth rate of precursor particles compared to conventional cases. As illustrated in FIG. 19, however, pores were not generated in the precursor and the concentration gradient is well formed. FIGS. 19A and 19B are a photographic image illustrating the Ni—Co—Mn precursor ($Ni_xCo_yMn_{1-x-y}(OH)_2$) having the concentration gradient according the center distance and a graph of the concentration gradient.

FIG. 20 is a table showing comparison of particle sizes and tap density of the Ni—Co—Mn precursor ($Ni_xCo_yMn_{1-x-y}(OH)_2$) having a particle size of as small as 5 μm, which is prepared by the reaction apparatus and the method according to the present disclosure. Under the same process conditions, the reaction time and tap density of the present disclosure, in which the injection position of the injection nozzle varies according to the solution level is enhanced compared to a conventional case, in which the injection position of the injection nozzle is fixed to the lower portion of the reaction vessel.

Consequently, the reaction apparatus 1 of the present disclosure has an improved growth rate of precursor under the same process condition by suppressing the generation of a difference in concentrations in the reaction vessel 10. In addition, the sphericity of the precursor may be improved and due to uniform stirring, generation of particles having a particle size larger than a target particle size can be suppressed.

For example, the morphology of a primary particle of a precursor varies generally depending on pH thereof. When a Ni content in the $Ni_xCo_yMn_{1-x-y}(OH)_2$ precursor is greater than 80%, the primary particle has a needle shape at a pH of 11 and a flake shape at a pH of 12. To control pH, NaOH is generally added. When the flow is stagnant near an injection nozzle, a relatively high pH is maintained near the nozzle, while a low pH is maintained at a distance away from the nozzle due to co-precipitation consuming OH—. This leads to reduction of uniformity of the morphology during precursor growth, and becomes worse as the capacity of the co-precipitation reactor increases.

That is, the reaction apparatus 1 of the present disclosure is advantageous in terms of morphology as the concentration difference in the reaction vessel can be overcome.

FIGS. 4 to 9 illustrate exemplary embodiments of the injection nozzles of the reaction apparatus 1 of the present disclosure (only the reference numbers of 52, 62 and 72 are indicated for the injection nozzles in the drawings; however, other injection nozzles 54, 56, 64, 66, 74 and 76 are applicable).

For example, as illustrated in FIGS. 4 and 5, the injection nozzles 52, 62 and 72 of the first to third raw material-injecting means 50, 60 and 70 may be provided in an interspace A2 between the reaction vessel bottom 12 and the impellers and an interspace A1 between the impellers in the form bent at least 90° in lower portions of the supply pipes 100 and 110, as previously described.

In other words, as the injection nozzles of the present disclosure are provided in a structure bent at least 90°, there is no remainder of the solutions inside the nozzle. Further, as the injection nozzles are in the form of a nozzle, which is bent and extends from the lower portion of the vertical supply pipes 100 and 110 inside the reaction vessel 10, a collision occurs with the nozzle itself when the solution is stirred, thereby increasing the stirring efficiency.

For example, as shown in FIGS. 5A and 5C, an additional projection (bent) portions X at an end of the nozzle may improve the stirring efficiency upon stirring with the solution.

As illustrated in FIGS. 3 and 6, the injection nozzles 52, 62 and 72 may be integrally bent at the lower portion of the metal solution-supply pipe 100 and the first and second solution-supply pipe 110 to provide a nozzle portion or assembled with the supply pipes by a screw S fastening method in a disassembled state.

The injection nozzles to be assembled in FIG. 6 may require an additional assembling process but may be advantageous in modifying or maintaining the form of the injection nozzles.

As illustrated in FIG. 7, the injection nozzles of the present disclosure may be provided as a coil-type injection nozzle C. In this case, the coil-type injection nozzle C may maximize a collision effect with the solution during stirring, thereby improving the stirring effect.

As illustrated in FIG. 8, the injection nozzles of the present disclosure in a plane may be disposed to be inclined at an angle in a direction of rotation of the impellers 32, which is a stirring means 30. In this case, the solutions are injected in an inclined angle in the direction of rotation of the impellers, thereby enhancing the stirring effect.

As illustrated in FIG. 9, the injection nozzles may be provided to have a plurality of raw material-injecting holes H with an appropriate gradient. In this case, the solutions are further dispersed in at least the interspace between the impellers and the interspace between the impellers and the vessel bottom, thereby enhancing the stirring effect or reaction effect.

As illustrated in FIG. 10, the metal solution and first and second solution-supply pipes having the injection nozzles 52, 62 and 72 provided in the lower portions thereof may be provided as a movable supply pipe 120 capable of moving vertically through the reaction vessel 10.

That is, as illustrated in FIG. 10, a supply pipe 122 having a long rack 124 on one side thereof is provided inside a guide 126 installed in an opening of an upper cover (no reference number) of the reaction vessel 10, and a drive pinion 129 driven as a motor 128 provided on the upper cover at the outside of the reaction vessel 10 engages with the rack 124 of the movable supply pipe. Accordingly, the supply pipe 122 supported via the guide 126 according to a driving direction of the motor may be provided to be vertically movable through the reaction vessel 10.

It is preferable that the supply pipe 122 be beyond the rotational radius of the impeller, while the bent injection nozzles 52, 62 and 72 in the lower end thereof be provided to allow the metal solution and the first and second solutions to be blown into at least the interspace A1 between the impellers and the interspace A2 between the impellers and the reaction vessel bottom 12.

Such movable supply pipe 120, as illustrated in FIG. 2, is disposed at an interval of 90° in the counterclockwise direction of the reaction vessel to allow the metal solution and the first and second solutions to be injected inside the reaction vessel; however, the supply pipe 122 may be connected to a flexible pipe 127 compensating vertical movements of the supply pipe, not of the connection pipe of FIG. 3, which supplies the metal solution and the first and second solutions.

Accordingly, the movable supply pipe 120 of the present disclosure vertically moves according to the solution level in the reaction vessel while appropriately injecting the metal solution and the first and second solutions into a desired space (N1 or N2).

As illustrated in FIGS. 1 to 3, the reaction apparatus 1 may further include at least one porous baffle 150 provided inside the reaction vessel 10.

Meanwhile, FIGS. 21A and 21B show simulation results of flows according to presence of the baffles. Compared to FIG. 21A, in which no baffles are present, FIG. 21B, in which baffles are present, showed more active flow.

In addition, FIGS. 22A and 22B show simulation results of flows of baffles 150' having no holes and the porous baffles 150 of the present disclosure. In the case of the porous baffle 150 in which holes 152 are formed, improved flow was observed.

As in FIG. 2, four of the porous baffles 150 of the present disclosure may be provided at an interval of 90° through a support 151 on an inner wall of the reaction vessel 10.

In particular, the porous baffles 150, contrary to existing baffles, have holes 152 formed therein. As such, fluidity of the injected solutions is further improved during the operation of the reaction apparatus, thereby enhancing the reaction effect.

Meanwhile, FIGS. 11 to 13 illustrate various exemplary embodiments of such porous baffles 150 of the present disclosure.

That is, as illustrated in FIGS. 11A to 11F, a plurality of the holes 152 provided in the porous baffle 150 may preferably be formed in various shapes such as a circular shape 152$a$, an elliptical shape 152$b$, a square shape 152$c$, a rectangular shape 152$d$ and 152$e$, and the like.

As illustrated in FIG. 12, an insertion fixer 156 may further be included to be inserted in at least one opening 154 provided in the porous baffle 150 and to have the holes 152 formed therein.

In this case, the holes 152 in a desired form are formed in a plurality of the insertion fixers 156 and can appropriately be utilized according to an operational environment of the reaction apparatus.

As illustrated in FIG. 13, the holes 152 of the porous baffle 150 may be provided as inclined holes 152' whose outlet 152'$b$ is narrower than an inlet 152'$a$ in a cross-section thereof. Such inclined holes 152' may be provided in a baffle opening 154 through an additional insertion fixer 156, and the inclined holes involves a solution collision and discharge, thereby increasing the fluidity. This will enhance the reaction effect.

It is preferable that as illustrated in FIGS. 1 and 11A, the porous baffle 150 of the present disclosure be provided in a structure extending only to at least a periphery of a horizontal line Y of the lowermost impeller 32 of the stirring means 30.

For example, FIGS. 23A and 23B are images of simulation illustrating a flow state when the baffle extends only to at least a periphery of the horizontal line Y of the lowermost impeller 32 as in the present disclosure, and a case where the baffle extends beyond the lowermost impeller to the bottom of the reaction vessel. In the case of FIG. 23A, there is less ununiform flow, and in FIG. 23B, a dead zone is generated.

Although schematically illustrated in FIG. 2, the case of the reaction apparatus 1 of the present disclosure may further be provided with a nozzle 190 for nitrogen purging, a Di-water nozzle 210, and the like, for internal purging of the reaction vessel. As in FIG. 1, a heater 230 may further be provided on an outer edge of the reaction vessel 10 for temperature control of the solution in the vessel. As in FIGS. 1 to 3, a sensing tank 170 for discharging the solution from the lower portion of the reactor using a circulating pump to circulate may further be provided on one side of an upper portion of the reaction vessel 10.

Meanwhile, the reaction method of the present disclosure based on thus-far described reaction apparatus 1 employs metal solution injection involving injecting a metal solution obtained by mixing a core solution and a shell solution at a pre-determined ratio into a reaction vessel at a pre-determined flow rate, solution injection involving injecting other solutions into the reaction vessel at a pre-determined flow rate, and co-precipitation involving stirring the other solutions with the metal solution injected into the reaction vessel to prepare a cathode active material for a lithium secondary battery having a concentration gradient.

As sufficiently described above, the metal solution and the other solutions in the reaction method are injected into at least the interspace A2 between the lowermost impeller and the reaction vessel bottom 12 in addition to the interspace A1 between the impellers of the stirring means. In particular, the metal solutions and the other solutions are injected into the reaction vessel corresponding to a level of the solutions in the reaction vessel, which is detected by the vessel weight-sensing means 130.

In other words, in the co-precipitation, the metal solution having a composition of Ni:Co:Mn or Ni:Co:Al and the other solutions of NaOH and NH$_4$OH are reacted to prepare a nickel-cobalt-manganese precursor (Ni$_x$Co$_y$Mn$_{1-x-y}$(OH)$_2$) or a nickel-cobalt-aluminum precursor (Ni$_x$Co$_y$Al$_{1-x-y}$(OH)$_2$) having a concentration gradient according to at least a center distance.

Although the exemplary embodiments of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above embodiments but by the claims and the equivalents thereof.

INDUSTRIAL APPLICABILITY

As described above, the present disclosure is useful in preparation of a catalyst or a cathode active material for a lithium secondary battery.

The invention claimed is:

1. A reaction apparatus, comprising:
a reaction vessel;
a stirring means provided inside the reaction vessel and having multistage impellers; and
a raw material-injecting means connected to the reaction vessel and comprising at least one injection nozzle injecting a raw material into an interspace between the impellers,
wherein the raw material comprises a metal solution,
the raw material-injecting means comprises a first raw material-injecting means injecting the metal solution at least into the interspace between the impellers, and in connection with a metal solution-mixing means disposed outside of the reaction vessel,
the metal solution-mixing means mixes a pre-determined ratio of a shell solution and a core solution of the metal solution to supply,
the raw material further comprises first and second solutions and the reaction apparatus is provided as a coprecipitation reaction apparatus for preparing a cathode active material for a lithium secondary battery, and the raw material-injecting means further comprises second and third raw material injecting means involving injecting the first and second solutions into the interspace between the impellers.

2. The reaction apparatus of claim 1, wherein the first to third raw material-injecting means further comprises an injection nozzle through which the raw material is injected into an interspace between a bottom of the reaction vessel and a lowermost impeller, in addition to the interspace between the impellers.

3. The reaction apparatus of claim 1, further comprising a vessel weight-sensing means provided on the outside of the reaction vessel such that the metal solution injected into the interspace between the impellers and the first and second solutions are injected according to a solution level of the reaction vessel.

4. The reaction apparatus of claim 2, wherein the injection nozzle of the first raw material-injecting means is provided in a single body or detachably assembled with an end of a metal solution-supply pipe connected to the metal solution-mixing means, and
the injection nozzle of the second raw material-injecting means and the injection nozzle of the third raw material-injecting means are provided in a single body or are detachably assembled with ends of solution-supply pipes supplying the first and second solutions.

5. The reaction apparatus of claim 4, wherein the injection nozzle is provided in a lower portion of the metal solution-supply pipe and the solution-supply pipes in a form bent at least 90° to inject the raw material into at least one of the interspace between the impellers and the interspace between a bottom of the reaction vessel and the impeller.

6. The reaction apparatus of claim 2, wherein the injection nozzle comprises a plurality of raw material-injecting holes.

7. The reaction apparatus of claim 2, wherein the injection nozzle is provided as a coil-type injection nozzle having a coil shape.

8. The reaction apparatus of claim 4, wherein the metal solution-supply pipe and the solution-supply pipes each having a lower portion to which the injection nozzle is provided are provided as a movable supply pipe moving vertically through the reaction vessel.

9. The reaction apparatus of claim 1, further comprising at least one porous baffle provided inside the reaction vessel.

10. The reaction apparatus of claim 9, wherein a hole provided in the porous baffle is provided in at least one form of circular, elliptical and polygonal forms.

11. The reaction apparatus of claim 9, further comprising an insertion fixture inserted into at least one opening provided in the porous baffle,
wherein the insertion fixture is provided with holes.

12. The reaction apparatus of claim 9, wherein a hole provided in the porous baffle is provided as an inclined hole whose outlet is narrower than an inlet in a cross-section thereof.

13. The reaction apparatus of claim 9, wherein the porous baffle extends at least to a level of the lowermost impeller of the stirring means provided in the reaction vessel.

14. The reaction apparatus of claim 1, wherein the mixing means comprises:
a mixing tank;
a core solution-supply pipe and a shell solution-supply pipe connected to the mixing tank; and
flow regulators provided in the core solution-supply pipe and the shell solution-supply pipe.

15. A reaction method using the reaction apparatus of claim 1, the method comprising:
metal solution injection involving injecting the metal solution obtained by mixing the core solution and the shell solution at the pre-determined ratio into the reaction vessel at a first pre-determined flow rate;
solution injection involving injecting other solutions into the reaction vessel at a second pre-determined flow rate; and
co-precipitation involving stirring the other solutions with the metal solution injected into the reaction vessel to prepare the cathode active material.

16. The reaction method of claim 15, wherein the metal solution and the other solutions are injected into at least one of the interspace between the impellers of the stirring means provided in the reaction vessel and an interspace between a bottom of the reaction vessel and an impeller.

17. The reaction method of claim 15, wherein the metal solution and the other solutions are injected into the reaction vessel according to a solution level in the reaction vessel.

* * * * *